(12) United States Patent
Gehring

(10) Patent No.: US 11,952,977 B1
(45) Date of Patent: Apr. 9, 2024

(54) TELESCOPIC WIND TURBINE TOWER

(71) Applicant: Donald Gehring, Houston, TX (US)

(72) Inventor: Donald Gehring, Houston, TX (US)

( * ) Notice: Subject to any disclaimer, the term of this patent is extended or adjusted under 35 U.S.C. 154(b) by 0 days.

(21) Appl. No.: 18/523,064

(22) Filed: Nov. 29, 2023

(51) Int. Cl.
  *F03D 13/20* (2016.01)
  *E04H 12/18* (2006.01)
  *F03D 15/10* (2016.01)

(52) U.S. Cl.
  CPC ......... *F03D 13/205* (2023.08); *E04H 12/182* (2013.01); *F03D 15/10* (2016.05); *F05B 2240/912* (2013.01)

(58) Field of Classification Search
  CPC ..... F03D 13/205; F03D 15/10; E04H 12/182; F05B 2240/912
  See application file for complete search history.

(56) References Cited

U.S. PATENT DOCUMENTS

| | | |
|---|---|---|
| 4,311,434 A | 1/1982 | Abe |
| 5,181,693 A | 1/1993 | Lorenz |
| 8,192,160 B2 | 6/2012 | Lopez et al. |
| 8,959,870 B2 * | 2/2015 | Schmidt .................. F03D 13/20 52/118 |
| 10,337,499 B1 | 7/2019 | Srinivasan |
| 2009/0211174 A1 | 8/2009 | Henderson et al. |
| 2012/0159875 A1 * | 6/2012 | Meyer ..................... F03D 13/10 52/651.07 |
| 2013/0091784 A1 * | 4/2013 | Schmidt .................. F03D 80/88 52/115 |
| 2013/0186013 A1 * | 7/2013 | Jones ...................... F03D 13/10 52/745.18 |
| 2020/0248471 A1 * | 8/2020 | Chambers ............... F21L 14/04 |
| 2021/0222452 A1 | 7/2021 | Serna Garcia-Conde et al. |

FOREIGN PATENT DOCUMENTS

| | | |
|---|---|---|
| EP | 1057770 B1 | 10/2005 |
| EP | 2535578 A1 | 12/2012 |
| EP | 3260409 A1 | 12/2017 |
| EP | 3825548 A1 | 5/2021 |

\* cited by examiner

*Primary Examiner* — Aaron R Eastman

(57) ABSTRACT

A telescopic wind turbine tower includes a base, a telescopic tubular tower, a wind turbine assembly, and one or more jacking systems. The telescopic tubular tower is configured with a bottom section and one or more upper sections. The bottom section is concentrically mounted onto the base. The upper section or sections are slidably engaged to the bottom section through one or more jacking systems. The wind turbine assembly is mounted onto a top section from the upper sections and as the telescopic tubular tower is positioned between the base and the wind turbine assembly.

30 Claims, 18 Drawing Sheets

TELESCOPIC WIND TURBINE TOWER

FIELD OF THE INVENTION

The present invention relates generally to renewable power generation. More specifically, the present invention is a telescopic tubular tower so that the wind turbine assembly can be mounted with lower capital expenditure and maintained with lower operational cost.

BACKGROUND OF THE INVENTION

As technology and industry in the modern world continues to grow and expand, so do the power requirements. Many different sources of power generation exist today involving fossil fuel burning, solar, wind, geothermal, hydroelectric, wave and current power generation, etc. Wind turbines are a renewable energy source and convert the kinetic energy of wind into electrical energy. Wind turbines are generally installed as a wind farm and can generate a large amount of power. Wind turbines are an increasingly important source of intermittent renewable energy and used in many countries to lower energy costs and reduce reliance on fossil fuels. Wind turbines are manufactured in a wide range of sizes, with either horizontal or vertical axes, though horizontal is most common. Generally, a tower is built and then the wind turbine nacelle and their blades are lifted onto the tower using high lift capacity long boom crane. The assembly process of a wind turbine is expensive due to the operating charges of the high lift capacity long boom cranes. Furthermore, when repairs need to be done to the blades, the high lift capacity long boom cranes are utilized to disassemble the nacelle or the blades, accumulating additional expenses. Furthermore, the high elevation of the wind turbines also creates challenging and hazardous environments for assembly crews and maintenance crews.

It is therefore an objective of the present invention to provide a telescopic tubular tower for wind turbines so that the nacelle and the blades can be installed and removed, when necessary, without the need for a high lift capacity long boom crane. The present invention uses water, air, or mechanical power to extend or retract the telescopic tower. Due to the telescopic feature, the present invention allows the assembly crews and the maintenance crews to bypass the usage of the high lift capacity long boom cranes. As a result, the present invention is able to lower the capital expenses and operational expenses of the wind turbines and creates safer environments for the assembly crews and maintenance crews.

Since a wind turbine tower is long and heavy, it is transported horizontally to the site in sections. When the sections are at the site, the sections are upended into the vertical position and vertically lifted by high lift capacity long boom cranes. After lifting, the sections are joined together by various means, bolting, welding, concrete, etc. The method used to join the sections results in the tower having structural strength needed to resist maximum construction and operating conditions with the nacelle and blades installed.

The present invention allows the wind turbine tower sections to be transported separately and upended separately or transported in a compact manner together and upended and installed together with the upper sections inside the lower sections. The present invention allows the telescopic wind turbine tower sections to be upended together by many means without the need to use high lift capacity long boom cranes. The present invention allows the telescopic wind turbine tower sections to be raised and lowered with their nacelles and blades on top without the need for high-capacity long boom cranes. The present invention allows sections to be joined together very rapidly after being raised without the need to endanger a large team of personnel. The present invention allows sections to be disconnected very rapidly and lowered with their nacelles and blades on top without the need to endanger a large team of personnel.

The present invention allows floating wind turbine towers to be transported, with their nacelles and blades on top at a low elevation, for improved vessel stability, and once at site allows the low tower to be telescopically raised with its nacelle and blades on top to their final elevation without the need for high-capacity long boom cranes Eliminating the use of high-capacity long boom crane within floating offshore wind turbines provides a significant savings in relation to time and money.

The present invention also allows wind turbine towers to be lowered, with their nacelles and blades on top, for future low elevation maintenance, replacement, or removal without the need for high-capacity long boom cranes.

The present invention provides a telescopic tower which is high strength during all phases of construction and operation. More specifically, the present invention uses high strength of overlapping joints during raising and lowering and during operation via the usage of hermetically sealed locking systems and shim tightening systems. The locking systems and the tightening systems provide the required strength and stiffness of the overlapping tower joints and the tower itself for all conditions and the ability for the joints to be reliably locked to harness the wing energy and unlocked for lowering or lifting of the tower. Furthermore, the locking systems and the tightening systems are resistant to corrosion.

DETAILED DESCRIPTION OF THE INVENTION

All illustrations of the drawings are for the purpose of describing selected versions of the present invention and are not intended to limit the scope of the present invention.

The present invention is a telescopic wind turbine tower so that the wind turbine can be extended to generate electricity and retracted to perform repairs and maintenance. In other words, the present invention allows the assembly process of the wind turbine to be completed without using high lift capacity long boom cranes and the maintenance/repair crews to easily access the corresponding parts of the wind turbine by avoiding the use of the high lift capacity long boom cranes. As a result, the present invention is able to lower the capital expenditure and operational costs that are generally associated with the wind turbines.

Figure 5:
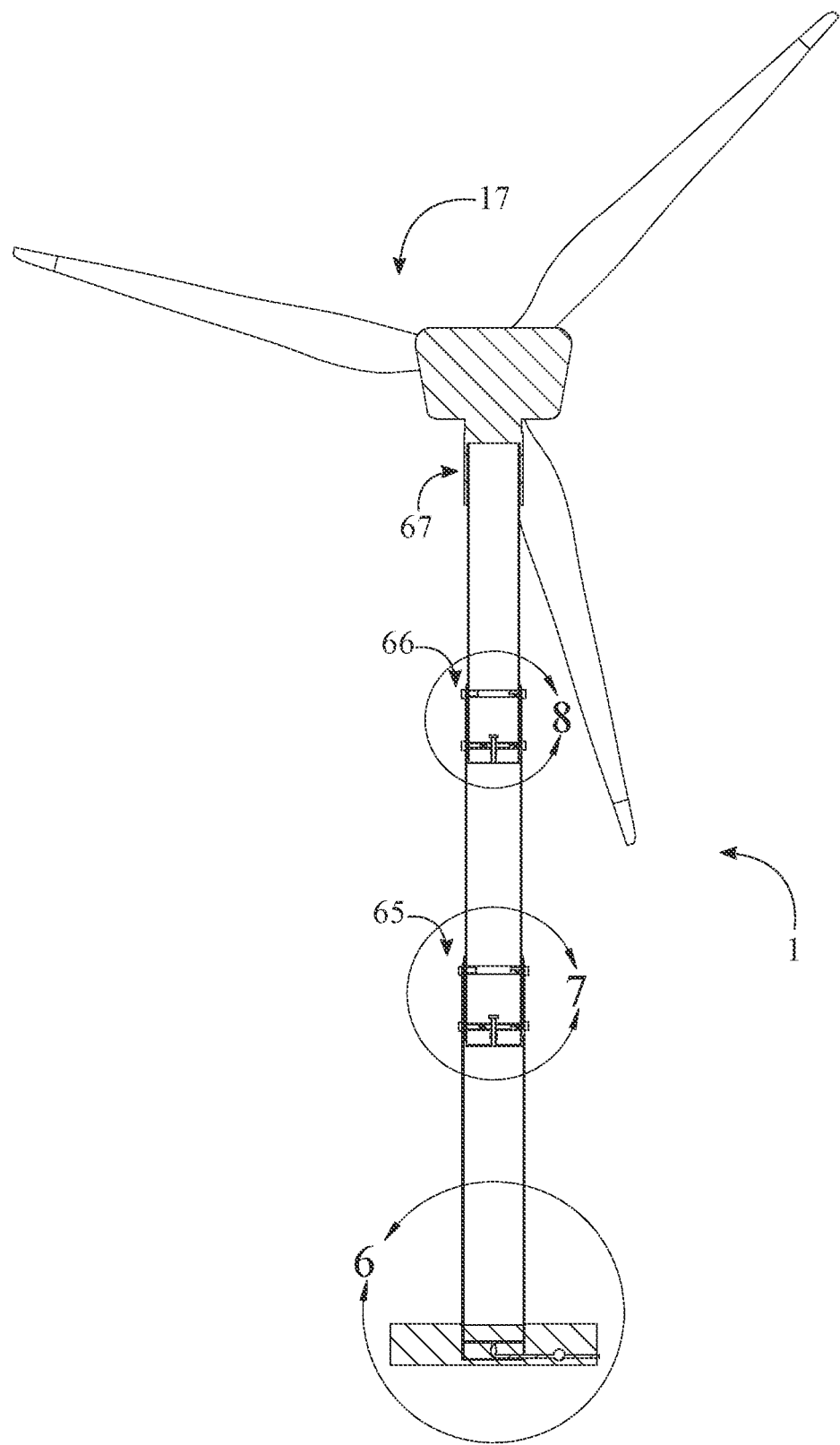
FIG. 5 is a cross section view of the present invention taken along line 5-5 of FIG. 4 and showing the detailed views that are shown in FIG. 6-8.

As shown in FIGS. 1-3 and FIGS. 6-8, the present invention comprises a base 16, a telescopic tubular tower 1, a wind turbine assembly 17, a first jacking system 27, a second jacking system 28, and a third jacking system 29. In reference to a general configuration of the present invention, the telescopic tubular tower 1 that controls the total height comprises a bottom section 2, at least one intermediate section 3, and a top section 4. The bottom section 2 is concentrically mounted onto the base 16 so that the bottom section 2 can function as the stationary member of the telescopic tubular tower 1. The intermediate section 3 is concentrically positioned within the bottom section 2 and positioned opposite to the base 16. The intermediate section 3 is slidably engaged to the bottom section 2 through the first jacking system 27 and the second jacking system 28 so that the intermediate section 3 can move upward from the bottom section 2 or move downward into the bottom section 2. The top section 4 is concentrically positioned within the intermediate section 3 and positioned opposite to the bottom section 2. The top section 4 is slidably engaged to the intermediate section 3 through the second jacking system 28 and the third jacking system 29 so that the top section 4 can move upward from the intermediate section 3 or move downward into the intermediate section 3. The first jacking system 27, the second jacking system 28, and the third jacking system 29 preferably utilize water so that the telescopic tower can be raised or lowered. The wind turbine assembly 17 that converts the kinetic energy of the wind into electricity is mounted to the top section 4 and positioned opposite to the intermediate section 3. The wind turbine assembly 17 can be mounted to the top section 4 by using industry standard mounting systems or any other types of mounting system. However, the wind turbine assembly 17 is preferably mounted to the top section 4 via an external top overlapping joint 67 as shown in FIG. 5.

In reference to a lifting process of the telescopic tubular tower 1, a quantity of water is first pumped into the top section 4 and then pumped into the intermediate section 3 as the displacement of the quantity of water lifts the top section 4. The quantity of water is then pumped into the bottom section 2 as the displacement of the quantity of water simultaneously lifts the top section 4 and the intermediate section 3. Once the top section 4 and the intermediate section 3 are lifted above the bottom section 2, the quantity of water can be drained from the bottom section 2 to complete the lifting process.

In reference to a lowering process of the telescopic tubular tower 1, a quantity of water is first pumped into the bottom section 2 until the bottom section 2 is full and pressurized. A valve is then open within the intermediate section 3 thus allowing the quantity of water to flow from the bottom section 2 into the intermediate section 3. As a result, the intermediate section 3 is lowered into the bottom section 2. When the intermediate section 3 is full of water and pressurized, a valve is opened within the top section 4 thus allowing the quantity of water to flow from the intermediate section 3 into the top section 4. As a result, the top section 4 is lowered into the intermediate section 3. When the top section 4 and the intermediate section 3 are lowered into the bottom section 2, all remaining water can then be drained from the bottom section 2, the intermediate section 3, and the top section 4 to complete the lowering process.

In reference to FIG. 4-8, the bottom section 2, the intermediate section 3, and the top section 4 are tubular members and each comprises a lateral wall 7 and a bottom wall 8. More specifically, the lateral wall 7 is perimetrically and hermetically connected around the bottom wall 8 so that the bottom section 2, the intermediate section 3, and the top section 4 can be formed into tubular members. More specifically, the lateral wall 7 of the intermediate section 3 is radially positioned within the lateral wall 7 of the bottom section 2 so that the intermediate section 3 can internally move upward and downward from the bottom section 2. The lateral wall 7 of the top section 4 is radially positioned within the lateral wall 7 of the intermediate section 3 so that the top section 4 can internally move upward and downward from the intermediate section 3.

Figure 6:
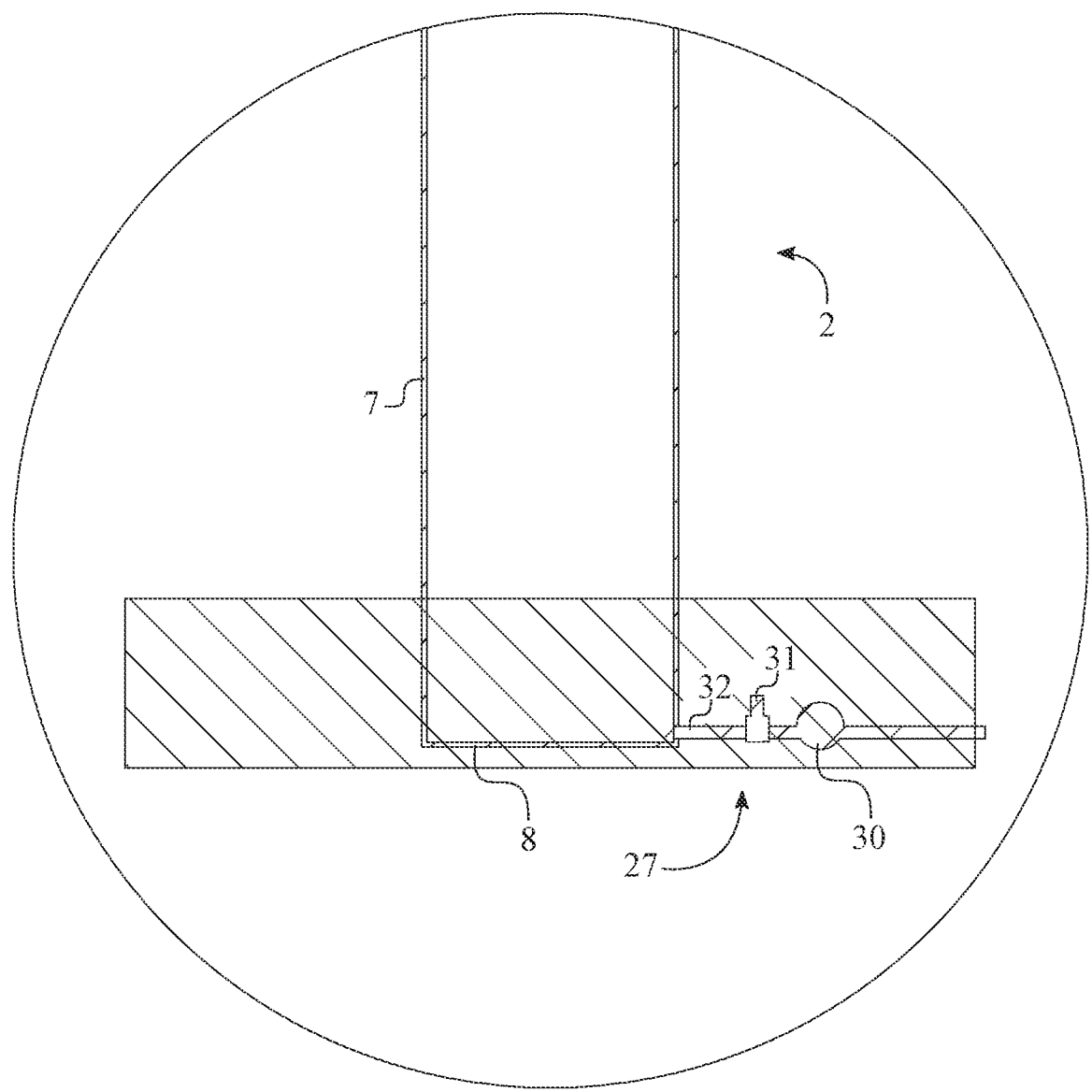
FIG. 6 is a detailed view of the present invention taken within section line 6.

In reference to FIG. 6, the bottom wall 8 of the bottom section 2 is connected to the base 16 thus maintaining an upright position for the bottom section 2. As a result, the intermediate section 3 is able to telescopically move in and out of the bottom section 2, and the top section 4 is able to telescopically move in and out of the intermediate section 3. The bottom section 2 is connected to the base 16 with industry standard fasteners or connection methods as the base 16 is structurally strengthened to withstand the weight of the present invention.

The first jacking system 27 is integrated into the bottom section 2 so that the first jacking system 27 is able to pump the quantity of water into the bottom section 2 during the lowering process or drain the quantity of water from the bottom section 2 during the lifting process. More specifically, the first jacking system 27 is positioned adjacent and external to the bottom wall 8 of the bottom section 2. In reference to FIG. 6, the first jacking system 27 comprises a pump 30, a drain valve 31, and a drain port 32. The pump 30 is externally positioned to the bottom section 2. The drain valve 31 is externally positioned to the bottom section 2. In other words, the pump 30 and the drain valve 31 are externally positioned to the lateral wall 7 of the bottom section 2 so that the pump 30 and the drain valve 31 can be remotely operated/maintained and located away from the quantity of water within the bottom section 2. The drain port 32 is integrated into the lateral wall 7 of the bottom section 2 thus allowing the quantity of water to travel in and out of the bottom section 2. The pump 30 is in fluid communication with the drain port 32 through the drain valve 31 to control the directional flow of the quantity of water. For example, the pump 30 can fill up the bottom section 2 with the quantity of water to initiate the lowering process or drain the quantity of water to finalize the lifting process.

Figure 7:
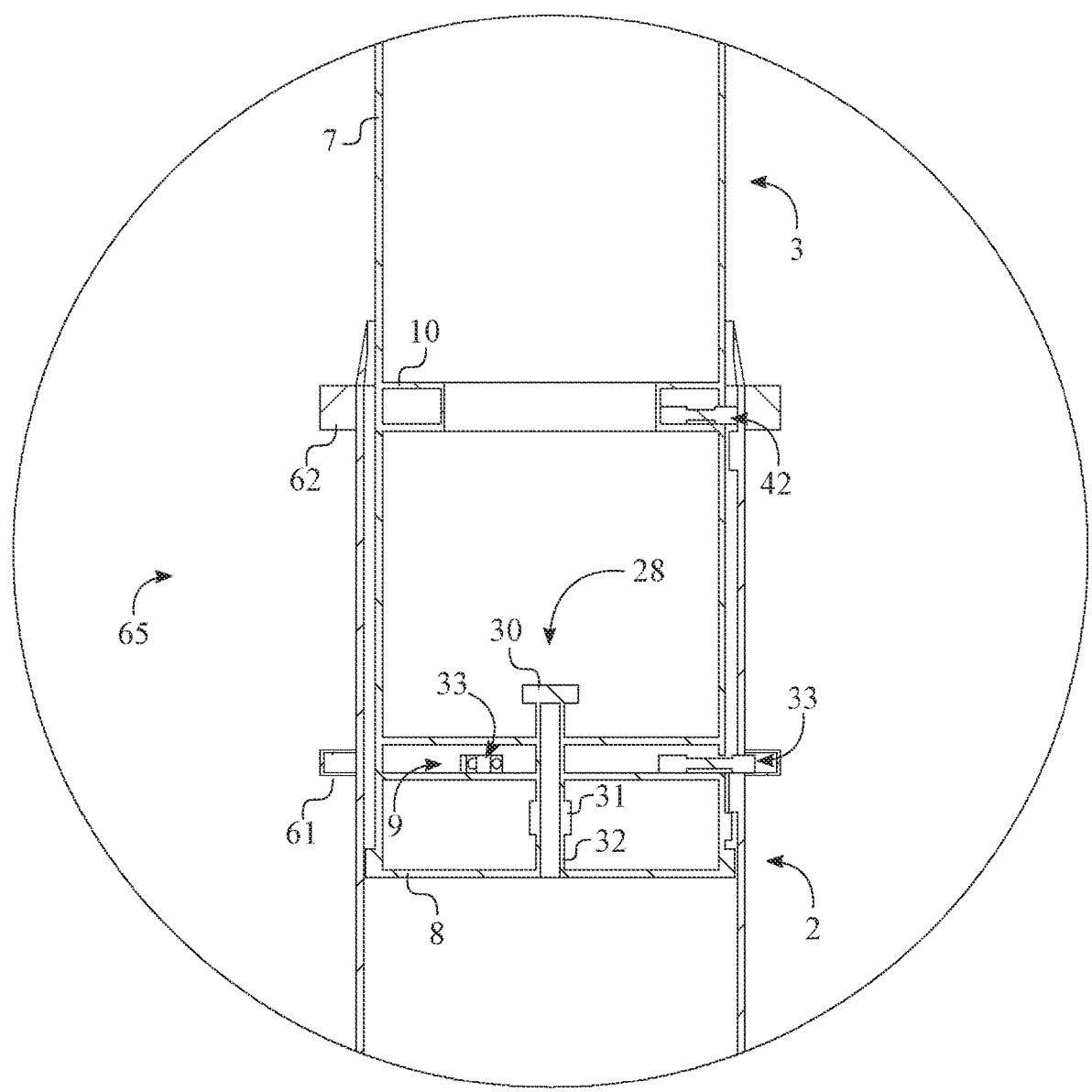
FIG. 7 is a detailed view of the present invention taken within section line 7.

In reference to FIG. 7, the intermediate section 3 further comprises a first enclosure 9 and a second enclosure 10. The first enclosure 9 is positioned parallel to the second enclosure 10 as the first enclosure 9 and the second enclosure 10 are positioned within the lateral wall 7 of the intermediate section 3. More specifically, the first enclosure 9 is positioned adjacent to the bottom wall 8 of the intermediate section 3 and perimetrically and hermetically connected to the lateral wall 7 of the intermediate section 3 as the first enclosure 9 is positioned in between the bottom wall 8 and the second enclosure 10. The second enclosure 10 is positioned offset from the first enclosure 9 as the second enclosure 10 is perimetrically and hermetically connected to the lateral wall 7 of the intermediate section 3. As a result, the first enclosure 9 and the second enclosure 10 are able to respectively function as a first hermetically sealed enclosure and a second hermetically sealed enclosure. In other words, the first hermetically sealed enclosure is utilized within the intermediate section 3 to hermetically position a plurality of first locking systems 33 of the present invention. The second hermetically sealed enclosure is utilized within the intermediate section 3 to hermetically position a plurality of first tightening systems 42 of the present invention. Furthermore, the second enclosure 10 can be configured as an annular enclosure thus providing flexibility to place the plurality of first tightening systems 42 in any radial configurations.

The second jacking system 28 is integrated into the bottom wall 8 of the intermediate section 3 so that the second jacking system 28 is able to lower the intermediate section 3 into the bottom section 2 during the lowering process or lift the intermediate section 3 from the bottom section 2 during the lifting process. In reference to FIG. 7, the second jacking system 28 is configured similar to the first jacking system 27 and comprises the pump 30, the drain valve 31, and the drain port 32. The pump 30 is positioned within the lateral wall 7 of the intermediate section 3 and in between the first enclosure 9 and the second enclosure 10. The drain valve 31 is positioned within the bottom wall 8 and the first enclosure 9 of the intermediate section 3. In other words, the drain valve 31 is positioned within a sealed enclosure so that the drain valve 31 can be remotely operated and protected from water. The drain port 32 is integrated into the bottom wall 8 of the intermediate section 3 thus allowing the quantity of water to travel in and out of the intermediate section 3. The present invention also provides access to the sealed enclosure through a hermetically sealed door so that the drain valve 31 and the drain port 32 can be accessed within the intermediate section 3. The pump 30 is in fluid communication with the drain port 32 through the drain valve 31 to control the directional flow of the quantity of water. For example, the pump 30 can transfer the quantity of water from the bottom section 2 to the intermediate section 3 during the lowering process or transfer the quantity of water from intermediate section 3 to the bottom section 2 during the lifting process.

Figure 8:
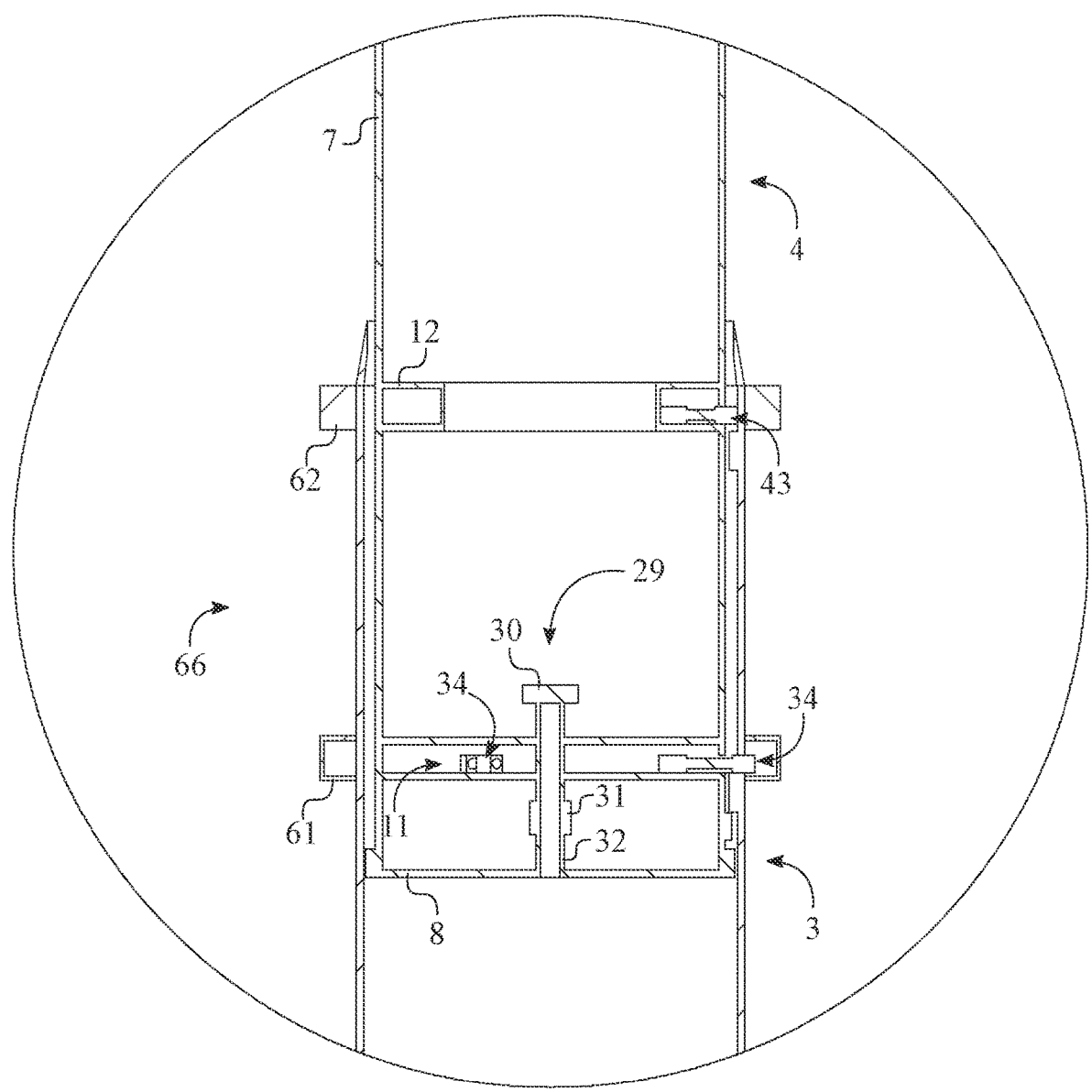
FIG. 8 is a detailed view of the present invention taken within section line 8.

In reference to FIG. 8, the top section 4 further comprises a third enclosure 11 and a fourth enclosure 12. The third enclosure 11 is positioned parallel to the fourth enclosure 12 as the third enclosure 11 and the fourth enclosure 12 are positioned within the lateral wall 7 of the top section 4. More specifically, the third enclosure 11 is positioned adjacent to the bottom wall 8 of the top section 4 and perimetrically and hermetically connected to the lateral wall 7 of the top section 4 as the third enclosure 11 is positioned in between the bottom wall 8 of the top section 4 and the fourth enclosure 12. The fourth enclosure 12 is positioned offset from the third enclosure 11 as the fourth enclosure 12 is perimetrically and hermetically connected to the lateral wall 7 of the top section 4. As a result, the third enclosure 11 and the fourth enclosure 12 are able to respectively function as a third hermetically sealed enclosure and a fourth hermetically sealed enclosure. In other words, the third hermetically sealed enclosure is utilized within the intermediate section 3 to hermetically position a plurality of second locking systems 34 of the present invention. The second hermetically sealed enclosure is utilized within the intermediate section 3 to hermetically position a plurality of second tightening systems 43 of the present invention. Furthermore, the fourth enclosure 12 can be configured as an annular enclosure thus providing flexibility to place the plurality of second tightening systems 43 in any radial configurations.

The third jacking system 29 is integrated into the bottom wall 8 of the top section 4 so that the third jacking system 29 is able to lower the top section 4 into the intermediate section 3 during the lowering process or lift the top section 4 from the intermediate section 3 during the lifting process. In reference to FIG. 8, the third jacking system 29 is configured similar to the second jacking system 28 and comprises the pump 30, the drain valve 31, and the drain port 32. The pump 30 is positioned within the lateral wall 7 of the top section 4 and in between the third enclosure 11 and the fourth enclosure 12. The drain valve 31 is positioned within the bottom wall 8 and the third enclosure 11 of the top section 4. In other words, the drain valve 31 is positioned within a sealed enclosure so that the drain valve 31 can be remotely operated and protected from water. The drain port 32 is integrated into the bottom wall 8 of the top section 4 thus allowing the quantity of water to travel in and out of the top section 4. The present invention also provides access to the sealed enclosure through a hermetically sealed door so that the drain valve 31 and the drain port 32 can be accessed within the top section 4. The pump 30 is in fluid communication with the drain port 32 through the drain valve 31 to control the directional flow of the quantity of water. For example, the pump 30 can transfer the quantity of water from the intermediate section 3 to the top section 4 during the lowering process or transfer the quantity of water from top section 4 to the intermediate section 3 during the lifting process.

In reference to FIG. 7, each of the plurality of first locking systems 33 is radially positioned within the first enclosure 9 of the intermediate section 3. As a result, the plurality of first locking systems 33 is able to lock a proximal end 5 of the intermediate section 3 to a distal end 6 of the bottom section 2 when the intermediate section 3 is lifted from the bottom section 2. Each of the plurality of the first tightening systems 42 is radially positioned within the second enclosure 10 of the intermediate section 3. As a result, the plurality of first tightening systems 42 is able to tighten and press the proximal end 5 of the intermediate section 3 against the distal end 6 of the bottom section 2 when the intermediate section 3 is lifted from the bottom section 2. In other words, the plurality of first locking systems 33 is hermetically positioned and mounted within the first enclosure 9 of the intermediate section 3 thus protecting the plurality of first locking systems 33 from outside elements. Similarly, the plurality of the first tightening systems 42 is hermetically positioned and mounted within the second enclosure 10 of the intermediate section 3 thus protecting the plurality of the first tightening systems 42 from outside elements.

In reference to FIG. 8, each of the plurality of second locking systems 34 is radially positioned within the third enclosure 9 of the top section 4. As a result, the plurality of second locking systems 34 is able to lock a proximal end 5 of the top section 4 to a distal end 6 of the intermediate section 3 when the top section 4 is lifted from the intermediate section 3. Each of the plurality of the second tightening systems 43 is radially positioned within the fourth enclosure 12 of the top section 4. As a result, the plurality of second tightening systems 43 is able to tighten and press the proximal end 5 of the top section 4 against the distal end 6 of the intermediate section 3 when the top section 4 is lifted from the intermediate section 3. In other words, the plurality of second locking systems 34 is hermetically positioned and mounted the third enclosure 11 of the top section 4 thus protecting the plurality of second locking systems 34 from outside elements. Similarly, the plurality of the second tightening systems 43 is hermetically positioned and mounted within the fourth enclosure 12 of the top section 4 thus protecting the plurality of the second tightening systems 43 from outside elements.

Figure 9:
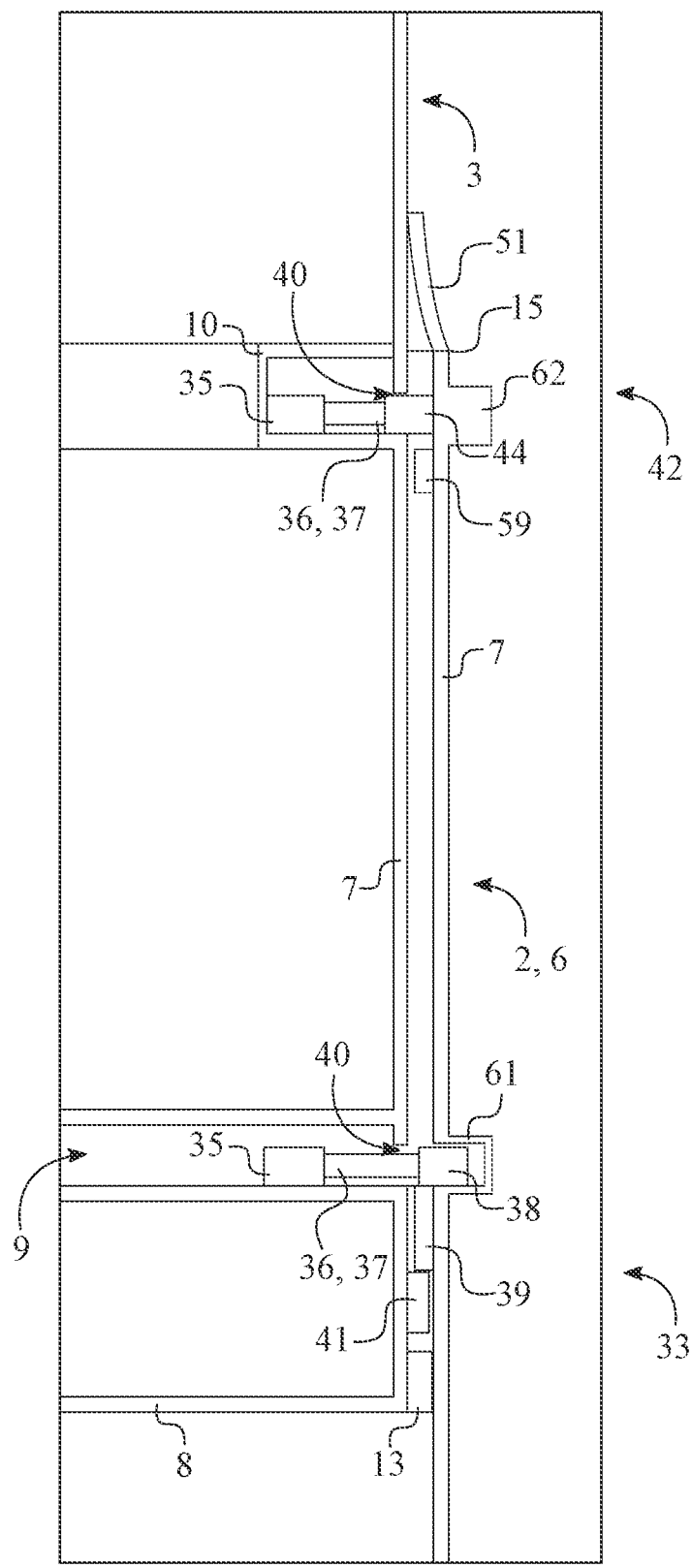
FIG. 9 is a schematic view showing the plurality of first locking systems and the plurality of first tightening systems, wherein the plurality of first locking systems and the plurality of first tightening systems are hermetically positioned within the intermediate section of the present invention.

In reference to FIG. 9, each of the plurality of first locking systems 33 comprises a jack body 35, a piston rod 36, a locking shim 38, a locking support 39, a lateral opening 40, and a stop 41 so that the plurality of first locking systems 33 can be functional. More specifically, the jack body 35 is connected within the first enclosure 9 of the intermediate section 3. The piston rod 36 is operatively coupled to the jack body 35, wherein the jack body 35 actuates the lateral movement of the piston rod 36. In other words, the piston rod 36 functions as an actuating arm and moves in and out from the jack body 35 as the movements of the piston rod 36 is controlled by the jack body 35. The locking shim 38 is connected to a free end 37 of the piston rod 36 in such a way that the movement of the piston rod 36 axially moves the locking shim 38 in and out from the intermediate section 3. Even though the present invention uses the piston rod 36 to actuate the locking shim 38 as the preferred component, the present invention can utilize a screw rod or any other industry standard components to actuate locking shim 38. The locking support 39 is internally connected to the lateral wall 7 of the bottom section 2 and positioned adjacent to the distal end 6 of the bottom section 2. The lateral opening 40 traverses through the lateral wall 7 of the intermediate section 3 thus allowing the locking shim 38 to move in and out through the lateral wall 7 of the intermediate section 3. The stop 41 is externally connected to the lateral wall 7 of the intermediate section 3 and positioned in between the first enclosure 9 and the bottom wall 8 of the intermediate section 3. The stop 41 functions as a barrier between the bottom section 2 and the intermediate section 3 to prevent complete separation of the intermediate section 3. For example, when the intermediate section 3 is lifted from the bottom section 2, the upward movement of the intermediate section 3 comes to a halt as soon as the stop 41 contacts the locking support 39. The locking shim 38 is concentrically positioned within the lateral opening 40 so that the locking shim 38 is able to freely move in and out through the lateral opening 40. When the upward movement of the intermediate section 3 stops, the locking shim 38 is laterally engaged with the locking support 39 as the locking support 39 is positioned between the locking shim 38 and the stop 41. As a result, the plurality of first locking systems 33 is able to lock the intermediate section 3 to the bottom section 2 during the lifting process. When the intermediate section 3 is lowered to the bottom section 2, the locking shim 38 is disengaged from the locking support 39 thus allowing the plurality of first locking systems 33 to be disengaged from the bottom section 2.

In reference to FIG. 9, each of the plurality of first tightening systems 42 comprises the jack body 35, the piston rod 36, a tightening shim 44, a tightening support 59, and the lateral opening 40. Each of the plurality of first tightening systems 42 is integrated into the proximal end 5 of the intermediate section 3 to prevent lateral movement between the intermediate section 3 and the bottom section 2. More specifically, the jack body 35 is connected within the second enclosure 10 of the intermediate section 3. The piston rod 36 is operatively coupled to the jack body 35, wherein the jack body 35 actuates the lateral movement of the piston rod 36. In other words, the piston rod 36 functions as an actuating arm and moves in and out from the jack body 35 as the movements of the piston rod 36 is controlled by the jack body 35. The tightening shim 44 is connected to the free end 37 of the piston rod 36 in such a way that the movement of the piston rod 36 axially moves the tightening shim 44 in and out from the intermediate section 3. Even though the present invention uses the piston rod 36 to actuate the tightening shim 44 as the preferred component, the present invention can utilize a screw rod or any other industry standard components to actuate the tightening shim 44. The tightening support 59 is internally connected to the lateral wall 7 of the bottom section 2 as the tightening support 59 is positioned adjacent to the distal end 6 of the bottom section 2. In order to allow the tightening shim 44 to traverse through the intermediate section 3, the lateral opening 40 traverses through the lateral wall 7 of the intermediate section 3. The tightening shim 44 is concentrically positioned within the lateral opening 40 so that the movement of the tightening shim 44 does not interfere with the lateral wall 7 of the intermediate section 3. The tightening support 59 is positioned adjacent and below the lateral opening 40 so that the tightening shim 44 can freely move in and out through the lateral opening 40. Resultantly, the tightening shim 44 is able to laterally engage with the lateral wall 7 of the bottom section 2 to prevent lateral movement of the intermediate section 3 as the tightening shim 44 is positioned atop the tightening support 59 during the movements of the tightening shim 44. For example, when each of the plurality of first locking systems 33 is engaged between the intermediate section 3 and the bottom section 2, the tightening shim 44 is outwardly extended through the lateral opening 40 and pressed against the lateral wall 7 of the bottom section 2 so that each of the plurality of first tightening systems 42 can prevent any lateral movements. When each of the plurality of first locking systems 33 is disengaged between the intermediate section 3 and the bottom section 2, the tightening shim 44 is retracted through the lateral opening 40 and positioned flush or about with the lateral wall 7 of the intermediate section 3 so that each of the plurality of first tightening systems 42 does not interfere with the lowering process of the telescopic tubular tower 1.

The locking support 39 from each of the plurality of first locking systems 33 and the tightening support 59 from each of the plurality of first tightening systems 42 work together to centralize the intermediate section 3 inside the bottom section 2 as the intermediate section 3 moves in and out within the bottom section 2. Furthermore, the locking support 39 from each of the plurality of first locking systems 33 and the tightening support 59 from each of the plurality of first tightening systems 42 work together to transfer shear and bending forces and minimize lateral movement between the intermediate section 3 and the bottom section 2 as the intermediate section 3 moves in and out within the bottom section 2. Furthermore, a small gap is configured in between the tightening shim 44 and the tightening support 59 which allows free movement of the tightening shim 44 and provides a safety support for the tightening shim 44.

In reference to FIG. 9, the present invention further comprises a first pressure seal 13. The first pressure seal 13 is externally connected to the lateral wall 7 of the intermediate section 3 and positioned adjacent to the bottom wall 8 of the intermediate section 3 and the stop 41 of each of the plurality of first locking systems 33. The first pressure seal 13 is radially and hermetically interposed between the lateral wall 7 of the intermediate section 3 and the lateral wall 7 of the bottom section 2 to prevent internal pressure loss of the bottom section 2. In other words, the first pressure seal 13 creates an airtight barrier between the intermediate section 3 and the bottom section 2 so that the quantity of water does not leak out of the bottom section 2 during the lifting process or the lowering process.

Figure 10:
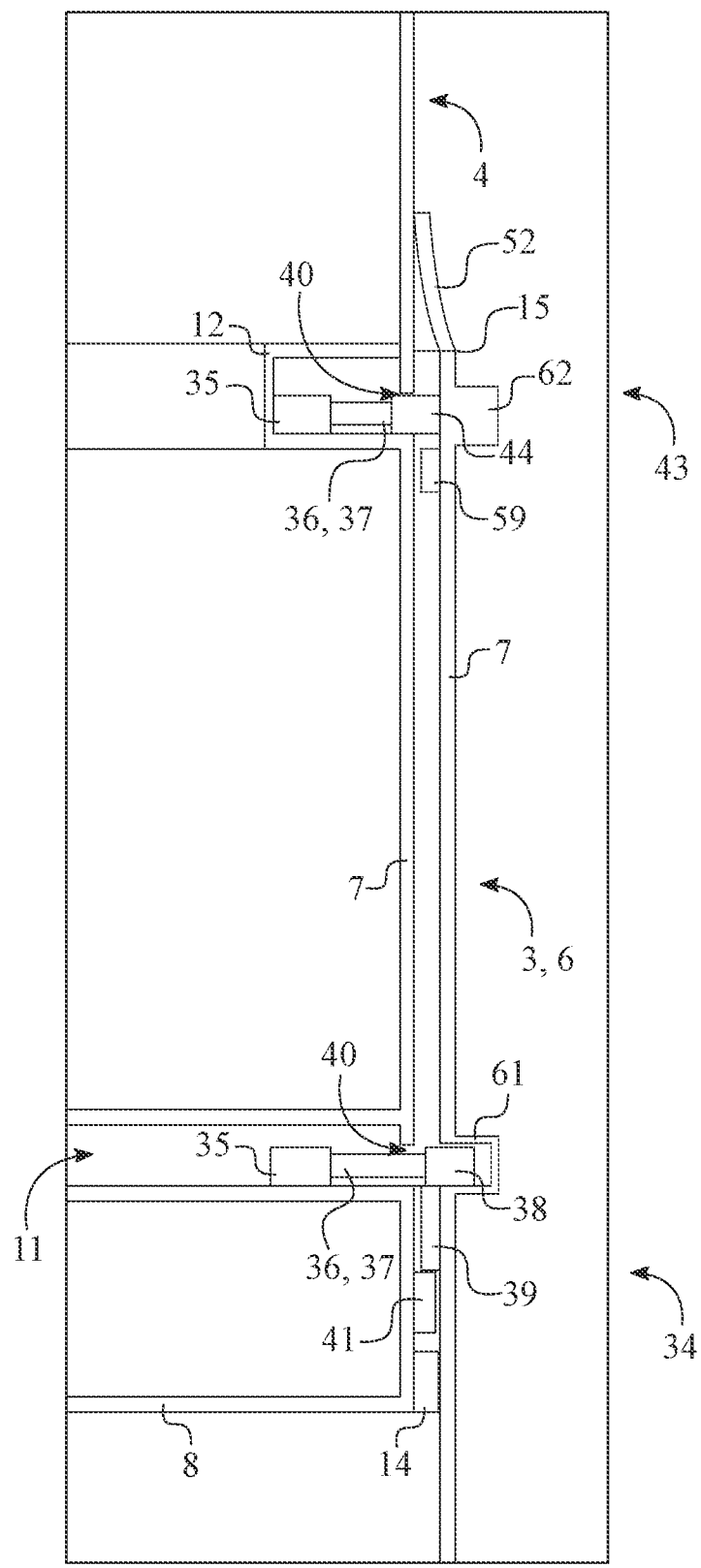
FIG. 10 is a schematic view showing the plurality of second locking systems and the plurality of second tightening systems, wherein the plurality of second locking systems and the plurality of second tightening systems are hermetically positioned within the top section of the present invention.

In reference to FIG. 10, each of the plurality of second locking systems 34 comprises the jack body 35, the piston rod 36, the locking shim 38, the locking support 39, the lateral opening 40, and the stop 41 so that the plurality of second locking systems 34 can be functional. More specifically, the jack body 35 is connected within the third enclosure 11 of the top section 4. The piston rod 36 is operatively coupled to the jack body 35, wherein the jack body 35 actuate the lateral movement of the piston rod 36. In other words, the piston rod 36 functions as an actuating arm and moves in and out from the jack body 35 as the movements of the piston rod 36 is controlled by the jack body 35. The locking shim 38 is connected to the free end 37 of the piston rod 36 in such a way that the movement of the piston rod 36 axially moves the locking shim 38 in and out from the top section 4. Even though the present invention uses the piston rod 36 to actuate the locking shim 38 as the preferred component, the present invention can utilize a screw rod or any other industry standard components to actuate locking shim 38. The locking support 39 is internally connected to the lateral wall 7 of the intermediate section 3 and positioned adjacent to the distal end 6 of the intermediate section 3. The lateral opening 40 traverses through the lateral wall 7 of the top section 4 thus allowing the locking shim 38 to move in and out through the lateral wall 7 of the top section 4. The stop 41 is externally connected to the lateral wall 7 of the top section 4 and positioned in between the third enclosure 11 and the bottom wall 8 of the top section 4. The stop 41 functions as a barrier between the intermediate section 3 and the top section 4 to prevent complete separation of the top section 4. For example, when the top section 4 is lifted from the intermediate section 3, the upward movement of the top section 4 comes to a halt as soon as the stop 41 contacts the locking support 39. The locking shim 38 is concentrically positioned within the lateral opening 40 so that the locking shim 38 is able to freely move in and out through the lateral opening 40. When the upward movement of the top section 4 stops, the locking shim 38 is laterally engaged with the locking support 39 as the locking support 39 is positioned between the locking shim 38 and the stop 41. As a result, the plurality of second locking systems 34 is able to lock the top section 4 to the intermediate section 3 during the lifting process. When the top section 4 is lowered to the intermediate section 3, the locking shim 38 is disengaged from the locking support 39 thus allowing the plurality of second locking systems 34 to be disengaged from the intermediate section 3.

In reference to FIG. 10, each of the plurality of second tightening systems 43 comprises the jack body 35, the piston rod 36, the tightening shim 44, a tightening support 59, and the lateral opening 40. Each of the plurality of second tightening systems 43 is integrated into the proximal end 5 of the top section 4 to prevent lateral movement between the top section 4 and the intermediate section 3. More specifically, the jack body 35 is connected within the fourth enclosure 12 of the top section 4. The piston rod 36 is operatively coupled to the jack body 35, wherein the jack body 35 actuates the lateral movement of the piston rod 36. In other words, the piston rod 36 functions as an actuating arm and moves in and out from the jack body 35 as the movements of the piston rod 36 is controlled by the jack body 35. The tightening shim 44 is connected to the free end 37 of the piston rod 36 in such a way that the movement of the piston rod 36 axially moves the tightening shim 44 in and out from the top section 4. Even though the present invention uses the piston rod 36 to actuate the tightening shim 44 as the preferred component, the present invention can utilize a screw rod or any other industry standard components to actuate the tightening shim 44. The tightening support 59 is internally connected to the lateral wall 7 of the intermediate section 3 as the tightening support 59 is positioned adjacent to the distal end 6 of the intermediate section 3. In order to allow the tightening shim 44 to traverse through the top section 4, the lateral opening 40 traverses through the lateral wall 7 of the top section 4. The tightening shim 44 is concentrically positioned within the lateral opening 40 so that the movement of the tightening shim 44 does not interfere with the lateral wall 7 of the top section 4. The tightening support 59 is positioned adjacent and below the lateral opening 40 so that the tightening shim 44 can freely move in and out through the lateral opening 40. Resultantly, the tightening shim 44 is able to laterally engage with the lateral wall 7 of the intermediate section 3 to prevent lateral movement of the top section 4 as the tightening shim 44 is positioned atop the tightening support 59 during the movements of the tightening shim 44. For example, when each of the plurality of second locking systems 34 is engaged between the top section 4 and the intermediate section 3, the tightening shim 44 is outwardly extended through the lateral opening 40 and pressed against the lateral wall 7 of the intermediate section 3 so that each of the plurality of second tightening systems 43 can prevent any lateral movements. When each of the plurality of second locking systems 34 is disengaged between the top section 4 and the intermediate section 3, the tightening shim 44 is retracted through the lateral opening 40 and positioned flush or about with the lateral wall 7 of the top section 4 so that each of the plurality of second tightening systems 43 does not interfere with the lowering process of the telescopic tubular tower 1.

The locking support 39 from each of the plurality of second locking systems 34 and the tightening support 59 from each of the plurality of second tightening systems 43 work together to centralize the top section 4 inside the intermediate section 3 as the top section 4 moves in and out within the intermediate section 3. Furthermore, the locking support 39 from each of the plurality of second locking systems 34 and the tightening support 59 from each of the plurality of second tightening systems 43 work together to transfer shear and bending forces and minimize lateral movement between the top section 4 and the intermediate section 3 as the top section 4 moves in and out within the intermediate section 3. Furthermore, a small gap is configured in between the tightening shim 44 and the tightening support 59 which allows free movement of the tightening shim 44 and provides a safety support for the tightening shim 44.

In reference to FIG. 10, the present invention further comprises a second pressure seal 14. The second pressure seal 14 is externally connected to the lateral wall 7 of the top section 4 and positioned adjacent to the bottom wall 8 of the top section 4 and the stop 41 of each of the plurality of second locking systems 34. The second pressure seal 14 is radially and hermetically interposed between the lateral wall 7 of the top section 4 and the lateral wall 7 of the intermediate section 3 to prevent internal pressure loss of the intermediate section 3. In other words, the second pressure seal 14 creates an airtight barrier between the top section 4 and the intermediate section 3 so that the quantity of water does not leak out of the intermediate section 3 during the lifting process or the lowering process.

In reference to FIG. 7, the bottom section 2 and the intermediate section 3 each comprises a lower wall stiffener 61 and an upper wall stiffener 62. More specifically, the lower wall stiffener 61 and the upper wall stiffener 62 stiffen and strengthen the lateral wall 7 of the bottom section 2 and the intermediate section 3 so that the plurality of first locking systems 33, the plurality of the first tightening systems 42, the plurality of second locking systems 34, the plurality of the second tightening systems 43 can function as intended in all load cases. The lower wall stiffener 61 and the upper wall stiffener 62 can be configured in many forms including but not limited to thicker wall sections of the lateral wall 7, diaphragms, stiffening rings, structural members, etc.

In reference to FIG. 7, the lower wall stiffener 61 of the bottom section 2 is externally connected to the lateral wall 7 of the bottom section 2 and positioned about the distal end 6 of the bottom section 2. The upper wall stiffener 62 of the bottom section 2 is externally connected to the lateral wall 7 of the bottom section 2 and positioned about the distal end 6 of the bottom section 2, wherein the lower wall stiffener 61 is offset from the upper wall stiffener 62. When the intermediate section 3 is raised from the bottom section 2, the lower wall stiffener 61 of the bottom section 2 is linearly aligned with each of the plurality of first locking systems 33 to compensate the applied pressure of each of the plurality of first locking systems 33. As a result, the locking shim 38 of each of the plurality of first locking system 33 is able to laterally engage within the lower wall stiffener 61 of the bottom section 2. Simultaneously, the upper wall stiffener 62 of the bottom section 2 is linearly aligned with each of the plurality of first tightening systems 42 to compensate the applied pressure of each of the plurality of first tightening systems 42. As a result, the tightening shim 44 of each of the plurality of first tightening systems 42 can be laterally pressed against the upper wall stiffener 62 of the bottom section 2 through the lateral wall 7 of the bottom section 2.

In reference to FIG. 7, the lower wall stiffener 61 of the intermediate section 3 is externally connected to the lateral wall 7 of the intermediate section 3 and positioned about the distal end 6 of the intermediate section 3. The upper wall stiffener 62 of the intermediate section 3 is externally connected to the lateral wall 7 of the intermediate section 3 and positioned about the distal end 6 of the intermediate section 3, wherein the lower wall stiffener 61 is offset from the upper wall stiffener 62. When the top section 4 is raised from the intermediate section 3, the lower wall stiffener 61 of the intermediate section 3 is linearly aligned with each of the plurality of second locking systems 34 to compensate the applied pressure of each of the plurality of second locking systems 34. As a result, the locking shim 38 of each of the plurality of second locking system 34 is able to laterally engage within the lower wall stiffener 61 of the intermediate section 3. Simultaneously, the upper wall stiffener 62 of the intermediate section 3 is linearly aligned with each of the plurality of second tightening systems 43 to compensate the applied pressure of each of the plurality of second tightening systems 43. As a result, the tightening shim 44 of each of the plurality of second tightening systems 43 can be laterally pressed against the upper wall stiffener 62 of the intermediate section 3 through the lateral wall 7 of the intermediate section 3.

In reference to FIG. 15-18, the present invention further comprises at least one first track system 45 so that the intermediate section 3 can maintain vertical and torsional alignment during the lifting process and the lowering process. More specifically, the first track system 45 comprises a first low-friction guide 46 and a first low-friction groove 47. The first low-friction groove 47 is internally positioned to the lateral wall 7 of the bottom section 2 and linearly connected along the lateral wall 7 of the bottom section 2. Furthermore, the first low-friction groove 47 internally extends about the proximal end 5 of the bottom section 2. The first low-friction guide 46 is externally positioned to the lateral wall 7 of the intermediate section 3 and linearly connected along the lateral wall 7 of the intermediate section 3. Furthermore, the first low-friction guide 46 externally extends from the first pressure seal 13 to the distal end 6 of the intermediate section 3. The first low-friction groove 47 is slidably engaged with the first low-friction guide 46 so that the intermediate section 3 can be lifted or lowered without any vertical and torsional misalignments.

Figure 13:
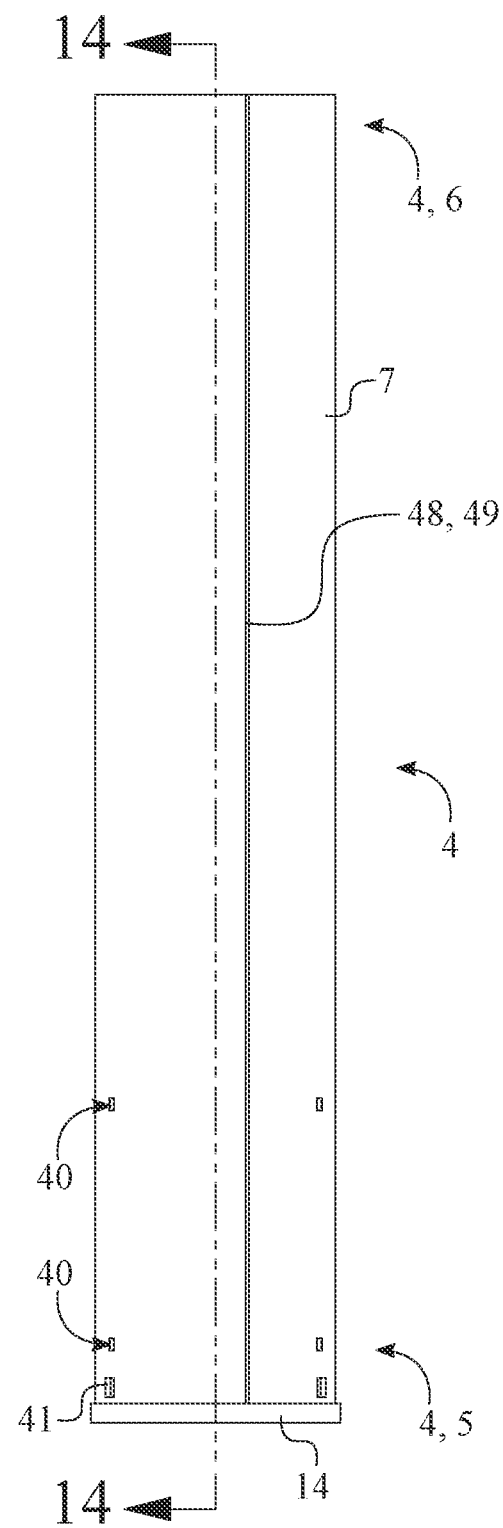
FIG. 13 is a side view of the top section of the present invention, showing the plane upon which a cross sectional view is taken shown in FIG. 14.
Figure 14:
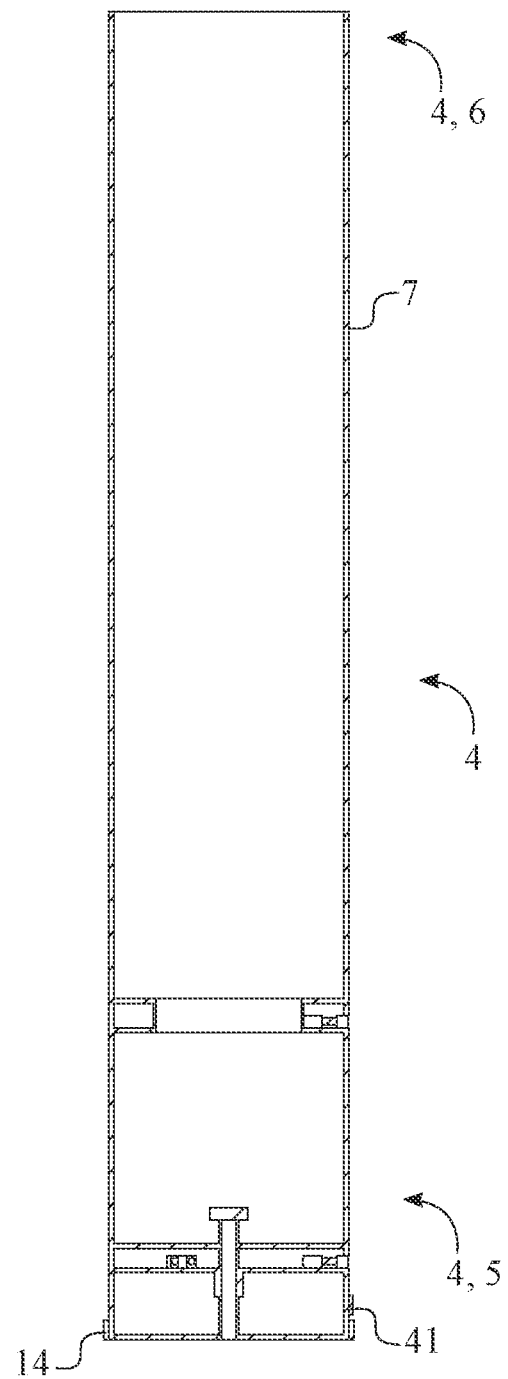
FIG. 14 is a cross section view of the top section along line 14-14 of FIG. 13.
Figure 15:
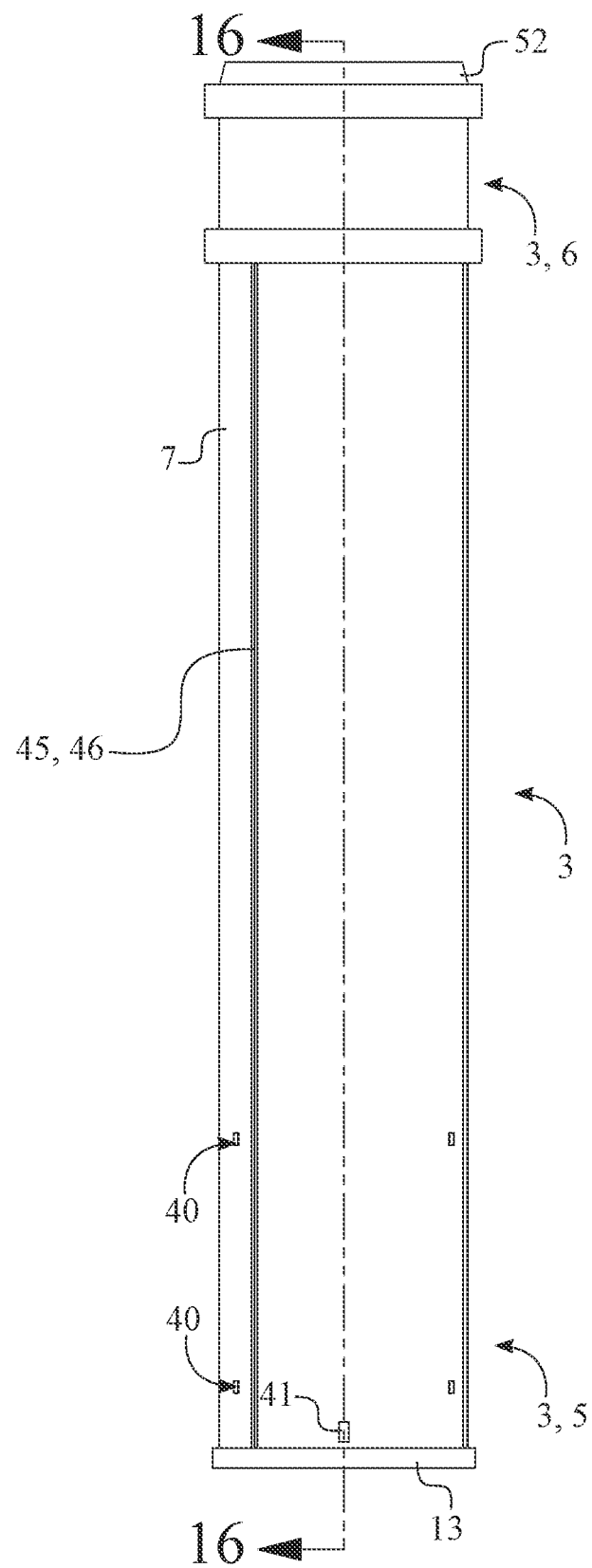
FIG. 15 is a side view of the intermediate section of the present invention, showing the plane upon which a cross sectional view is taken shown in FIG. 16.
Figure 16:
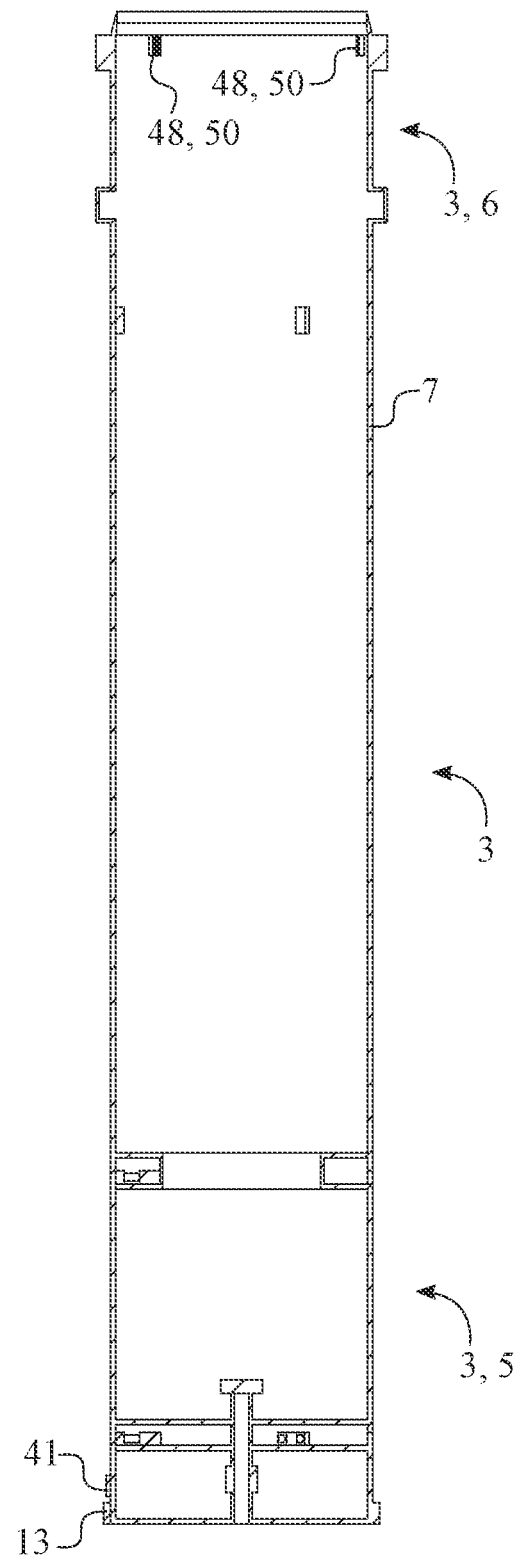
FIG. 16 is a cross section view of the intermediate section along line 16-16 of FIG. 15.
Figure 17:
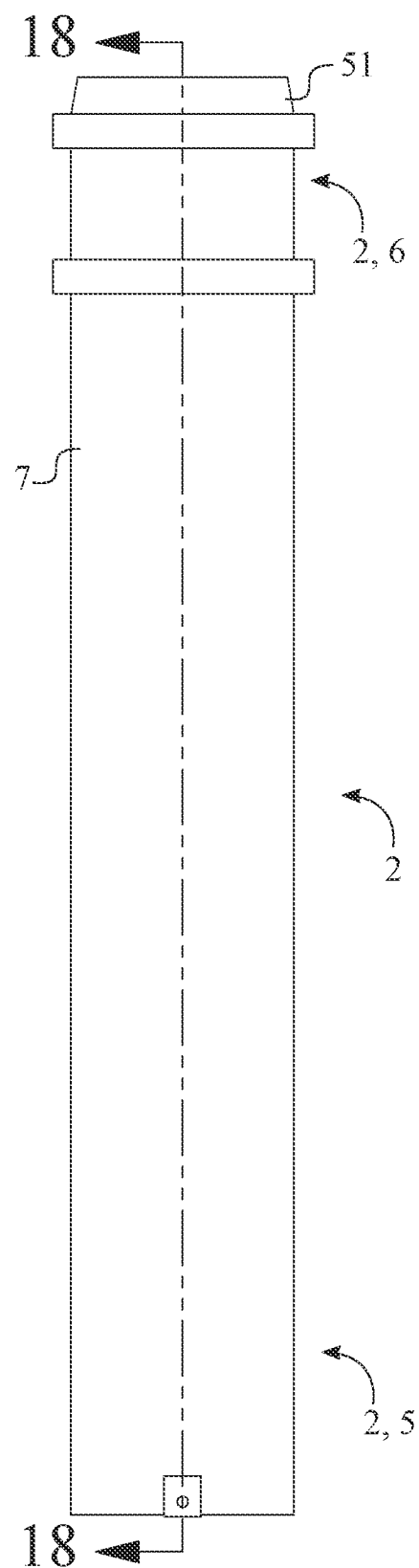
FIG. 17 is a side view of the bottom section of the present invention, showing the plane upon which a cross sectional view is taken shown in FIG. 18.
Figure 18:
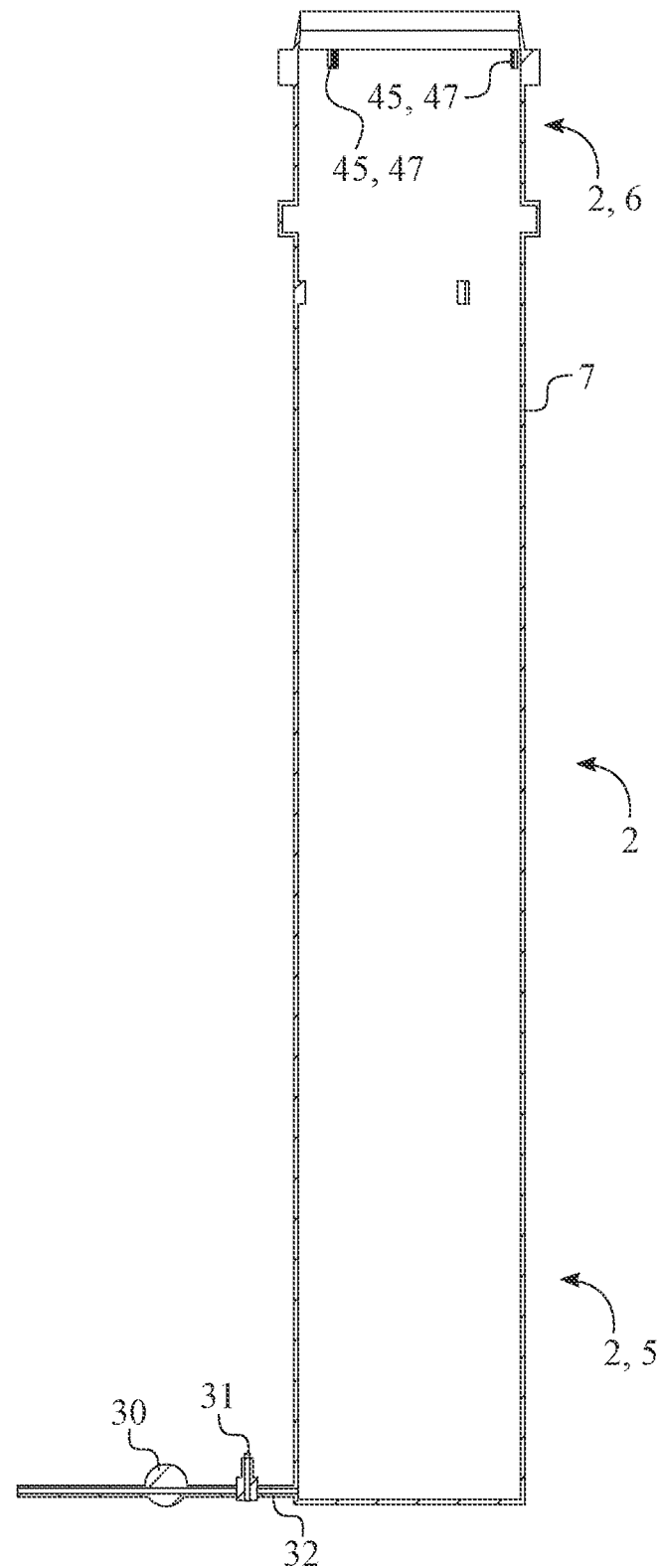
FIG. 18 is a cross section view of the bottom section along line 18-18 of FIG. 17.

In reference to FIGS. 13-14 and FIG. 16, the present invention further comprises at least one second track system 48 so that the top section 4 can maintain vertical and torsional alignment during the lifting process and the lowering process. More specifically, the second track system 48 comprises a second low-friction guide 49 and a second low-friction groove 50. The second low-friction groove 50 is internally positioned to the lateral wall 7 of the intermediate section 3 and linearly connected along the lateral wall 7 of the intermediate section 3. Furthermore, the second low-friction groove 50 internally extends about the proximal end 5 of the intermediate section 3. The second low-friction guide 49 is externally positioned to the lateral wall 7 of the top section 4 and linearly connected along the lateral wall 7 of the top section 4. Furthermore, the second low-friction guide 49 externally extends from the second pressure seal 14 to the distal end 6 of the top section 4. The second low-friction groove 50 is slidably engaged with the second low-friction guide 49 so that the top section 4 can be lifted or lowered without any vertical and torsional misalignments.

In reference to FIG. 9-10, the present invention further comprises a first rain seal 51 and a second rain seal 52. The first rain seal 51 is perimetrically connected to a top edge 15 of the bottom section 2 and pressed against the lateral wall 7 of the intermediate section 3 so that the internal gap between the bottom section 2 and the intermediate section 3 can be protected from outside elements such as rain, dirt, or snow. The second rain seal 52 is perimetrically connected to a top edge 15 of the intermediate section 3 and pressed against the lateral wall 7 of the top section 4 so that the internal gap between the intermediate section 3 and the top section 4 can be protected from outside elements such as rain, dirt, or snow. Furthermore, the structural integrity of the first rain seal 51 and the second rain seal 52 are maintained during the lifting process and the lowering process so that the intended functionality can be executed through the operation of the present invention.

Figure 1:
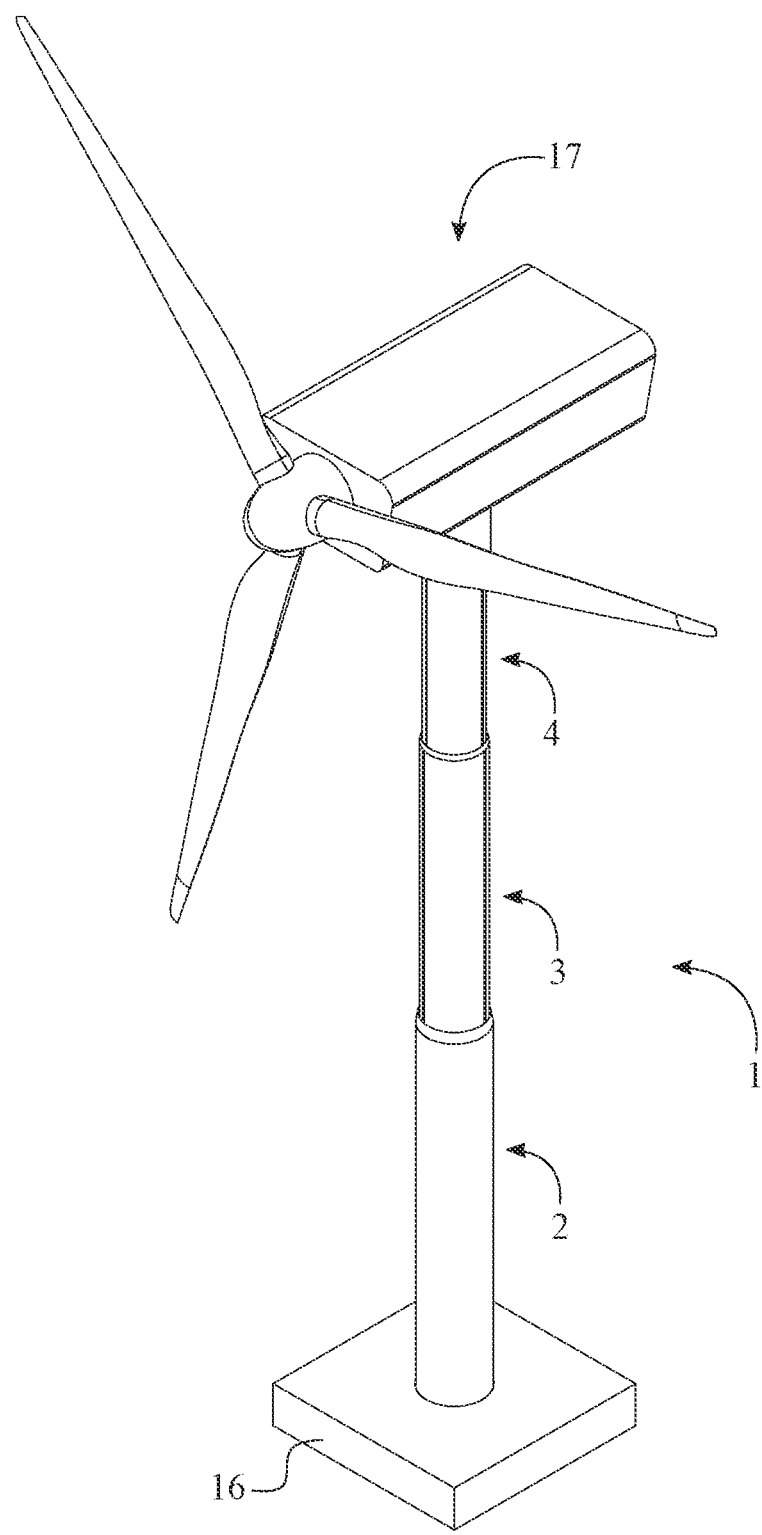
FIG. 1 is a perspective view of the present invention.
Figure 2:
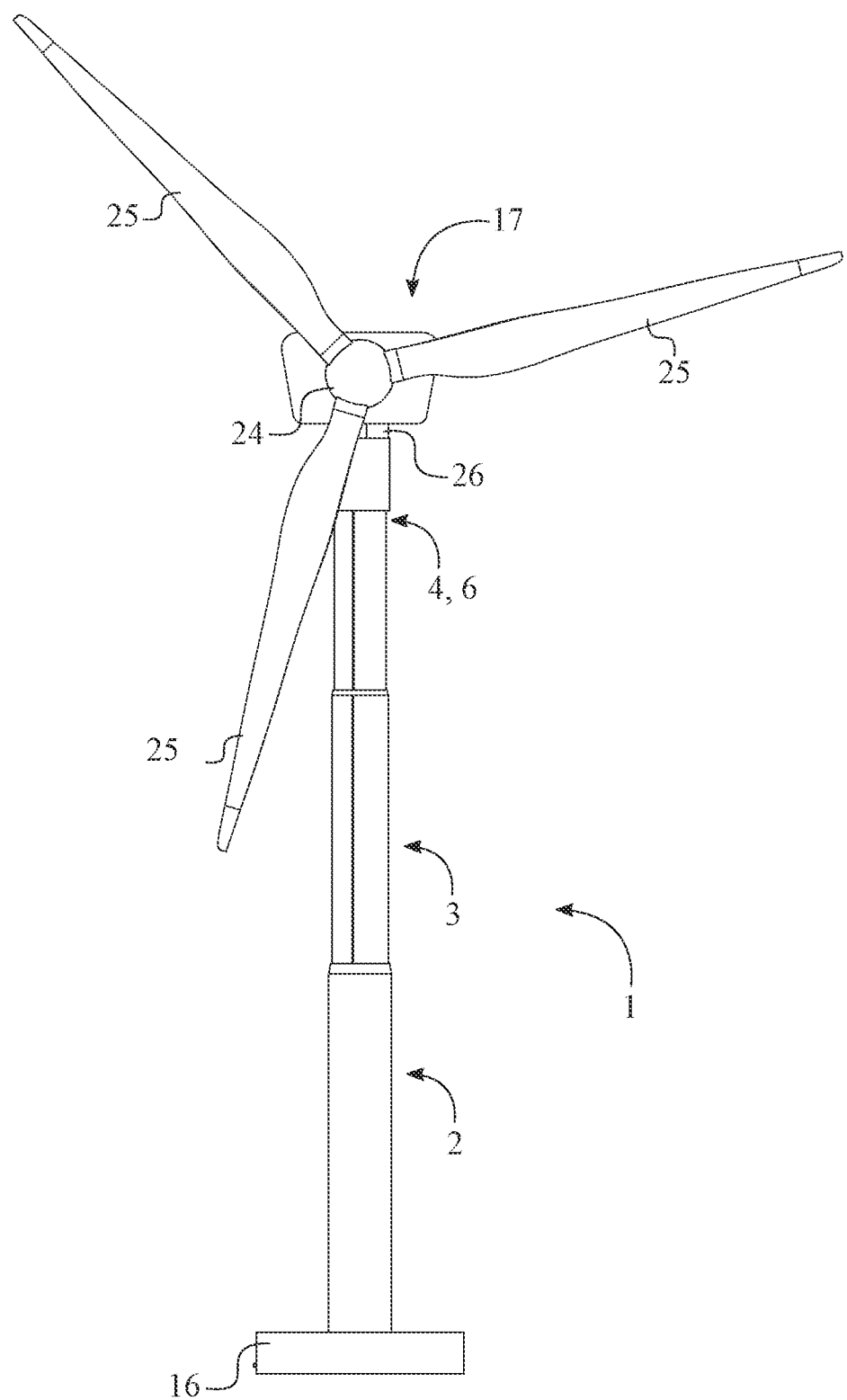
FIG. 2 is a front view of the present invention, wherein the telescopic tubular tower is raised.
Figure 3:
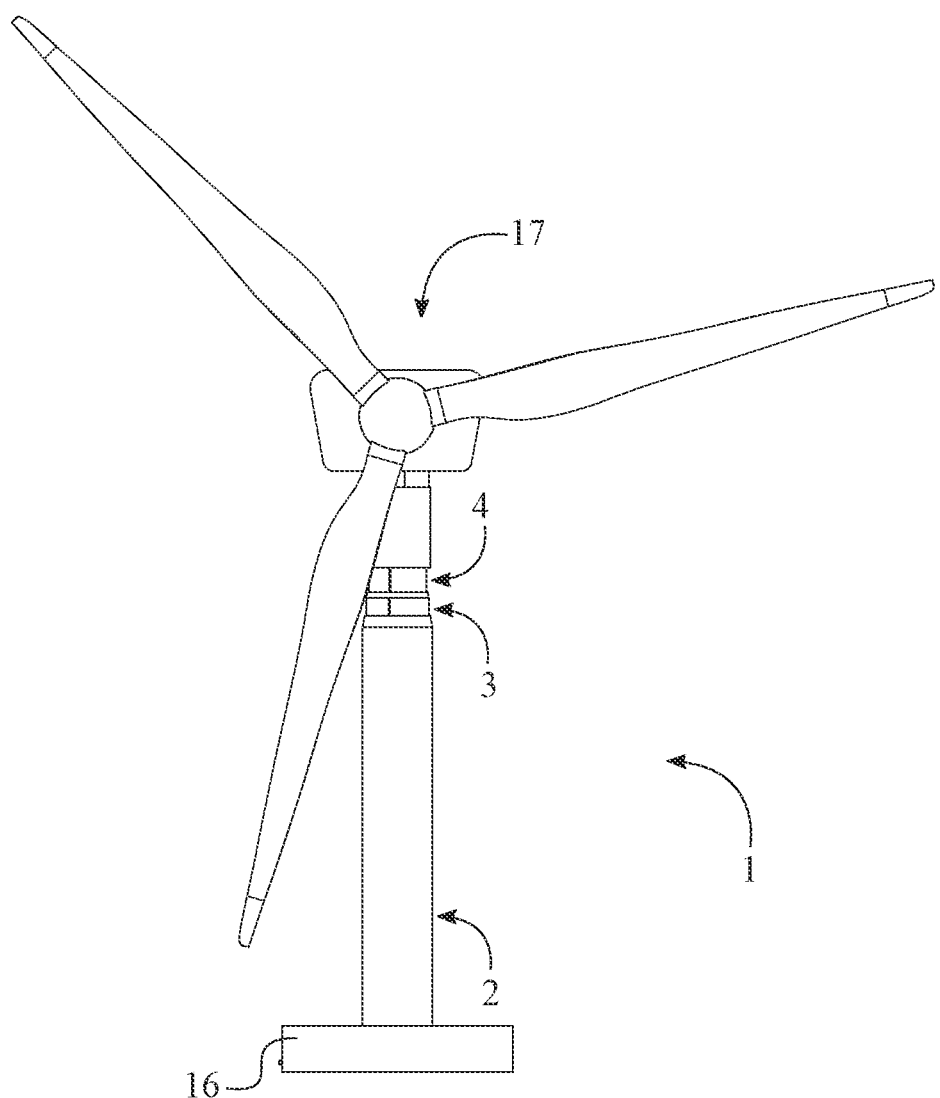
FIG. 3 is a front view of the present invention, wherein the telescopic tubular tower is lowered.
Figure 4:
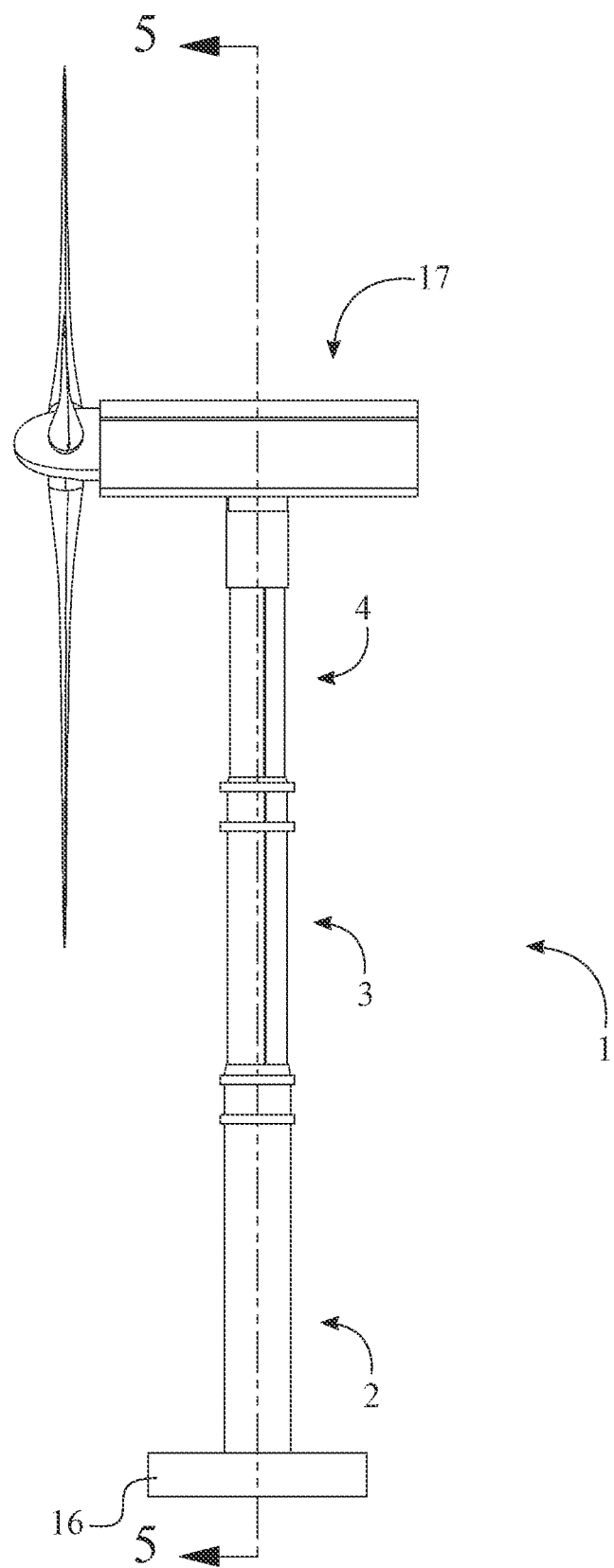
FIG. 4 is a side view of the present invention, showing the plane upon which a cross sectional view is taken shown in FIG. 5.

In reference to FIG. 1-2, the base 16 can be a ground foundation so that the telescopic tubular tower 1 can be assembled in dry land. Furthermore, the ground foundation is structurally strengthened to withstand the total weight of the present invention.

Figure 11:
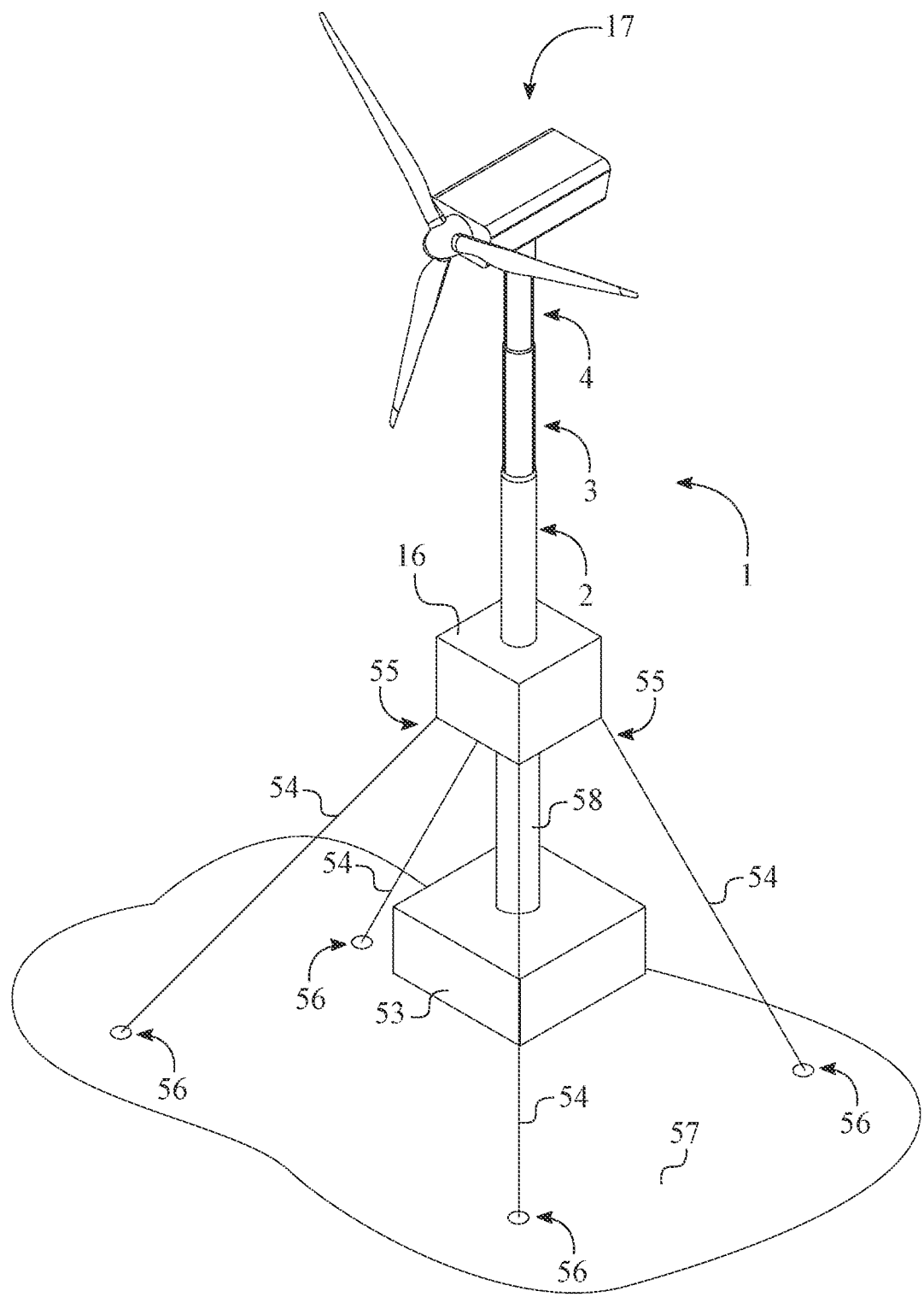
FIG. 11 is a perspective view of the present invention, wherein the base is a floating hull.

In reference to FIG. 11, the base 16 can be a floating hull so that the telescopic tubular tower 1 can be assembled in a body of water. In order for the floating hull to be mounted, the present invention further comprises a plurality of mooring lines 54, a submerged counterweight 53, and a tubular support column 58. The submerged counterweight 53 is concentrically connected to the base 16 (the floating hull) by the tubular support column 58 as the submerged counterweight 53 is positioned underneath the base 16 (the floating hull). The tubular support column 58 functions as the bottom static section of the telescopic wind turbine tower 1 that extends through the base 16 and above the base 16. The submerged counterweight 53 can be manufactured as a weighted body or filled with water according to the system specifications to maintain an upright position for the telescopic tubular tower 1 and the wind turbine assembly 17. The plurality of mooring lines 54 is radially positioned around the base 16 so that the base 16 can be mounted to a subsurface environment 57 such as seabed or lakebed. More specifically, a first end 55 of each of the plurality of mooring lines 54 is connected to the base 16. A second end 56 of each of the plurality of mooring lines 54 is tensionally tethered to the subsurface environment 57 so that the floating hull can be stationarily positioned within the body of water.

One or more telescopic tower sections, like the intermediate section 3 and the top section 4, can be raised above the bottom section 2 of the telescopic wind turbine tower 1 and can be retracted into the bottom section 2 of the telescopic wind turbine tower 1 and into the tubular support column 58 and the submerged counterweight 53 thus lowering the height of the wind turbine assembly 17 and the center of gravity of the entire floating offshore platform. The raising of the telescopic wind turbine tower 1 can be completed by local control systems or by remote-control systems using many methods including but not limited to, pressurizing the intermediate section 3 or the top section 4 either pneumatically or hydraulically and utilizing some form of jacking system located inside the bottom section 2, the intermediate section 3, the tubular support column 58 and/or the base 16. The lowering of the telescopic wind turbine tower 1 can be completed by local control systems or by remote-control systems using many methods including but not limited to, sequential flooding the telescopic wind turbine tower 1 by opening valves in the bottom section 2 or upper sections (the intermediate section 3 or the top section 4) of the telescopic wind turbine tower 1 causing the upper sections to lower into the flooded section below and eventually into the flooded the tubular support column 58 and using some form of jacking system located inside the bottom section 2, the intermediate section 3, the tubular support column 58 and/or the base 16.

Figure 12:
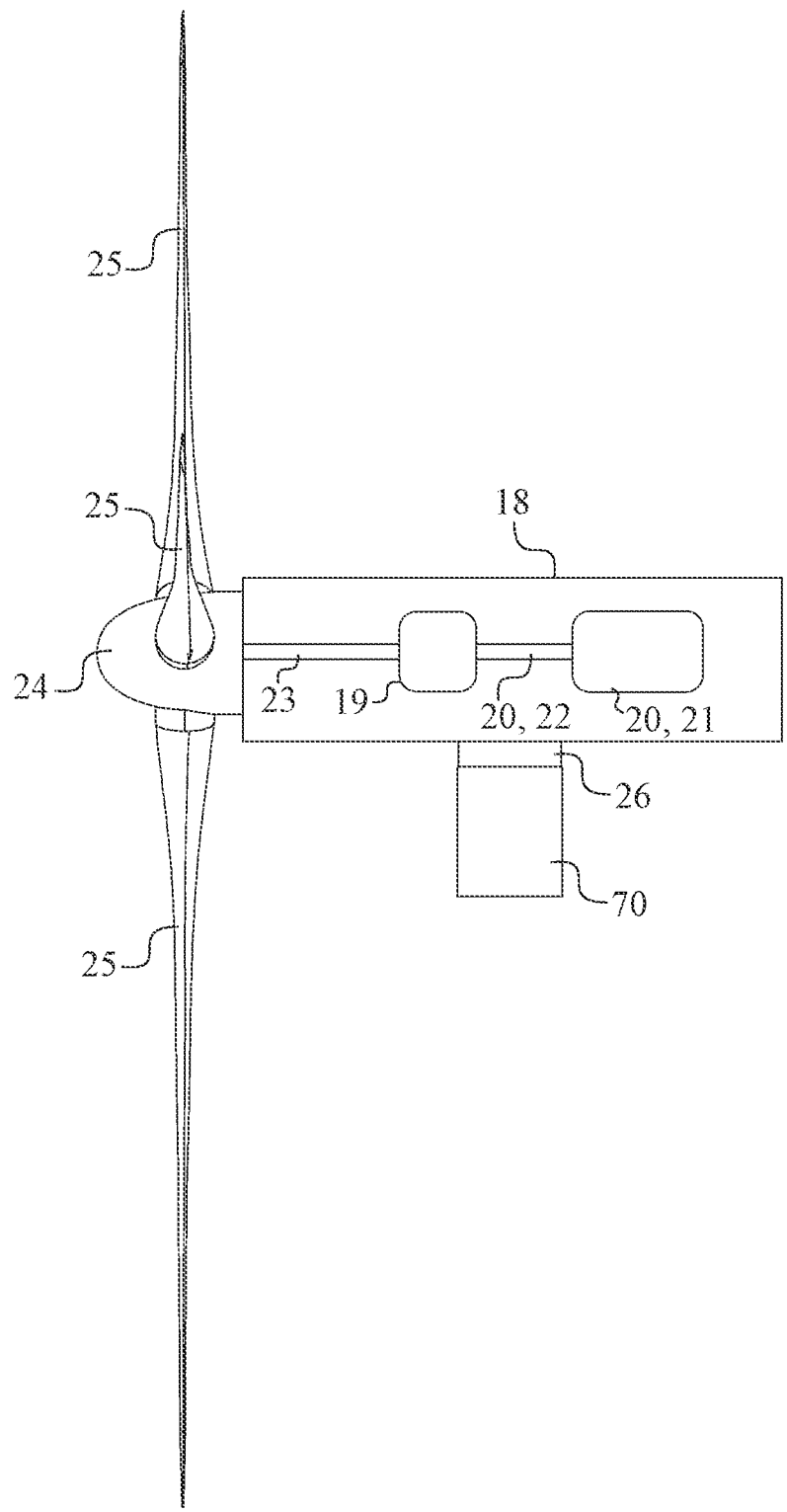
FIG. 12 is a schematic view showing the components of the wind turbine assembly.

In reference to FIG. 2 and FIG. 12, the wind turbine assembly 17 comprises a nacelle 18, a gearbox 19, a generator 20, a main shaft 23, a hub 24, a plurality of blades 25, a coupling 70, and a yaw drive 26 so that kinetic energy of the wind can be converted to electrical energy. The gearbox 19, the generator 20, and the main shaft 23 are positioned within the nacelle 18 to protect from outside elements such as rain. The hub 24 is externally positioned to the nacelle 18 and provides a surface area to mount the plurality of blades 25. A stator 21 of the generator 20 is mounted to the nacelle 18, and the gearbox 19 is mounted to the nacelle 18. A rotor 22 of the generator 20 is rotatably connected to the main shaft 23 through the gearbox 19 within the nacelle 18 thus allowing the hub 24 to be axially connected to the main shaft 23. Each of the plurality of blades 25 is radially connected to the hub 24. As a result, the plurality of blades 25 is able to harness the kinetic energy of the wind thus rotating hub 24, the main shaft 23, the gearbox 19, and the rotor 22. Then, the generator 20 is able to convert the kinetic energy of the wind into electrical energy. The yaw drive 26 is externally mounted to nacelle 18 so that the yaw drive 26 can efficiently orient the plurality of blades 25 to capture the optimal amount of wind energy. The coupling 70 is mounted to the yaw drive 26 and functions as a stationary mounting bracket to secure the wind turbine assembly 17 to the top section 4. In other words, the nacelle 18 is mounted to the distal end 6 of the top section 4 by the coupling 70 and through the yaw drive 26 so that the wind turbine assembly 17 is able to optimize its positioning against the wind for maximum power generation.

The present invention further comprises a bottom overlapping joint 65, an intermediate overlapping joint 66, and a top overlapping joint 67 in reference to the lifting process of the telescopic tubular tower 1. As shown in FIG. 5 and FIG. 7-8, The bottom overlapping joint 65, the intermediate overlapping joint 66, and the top overlapping joint 67 further strengthen the connection points of the telescopic tubular tower 1 with respect to the bottom section 2, the intermediate section 3, and the top section 4.

In reference to the bottom overlapping joint 65, as shown in FIG. 7 and FIG. 9, the lateral wall 7 of the intermediate section 3 is concentrically positioned within the lateral wall 7 of the bottom section 2. The bottom wall 8 of the intermediate section 3 and the first enclosure 9 of the intermediate section 3 are positioned about the distal end 6 of the bottom section 2. Each of plurality of first locking systems 33 is engaged to the distal end 6 of the bottom section 2 thus locking the bottom section 2 with the intermediate section 3. Each of the plurality of first tightening systems 42 is engaged to the distal end 6 of the bottom section 2 in order to further tighten the intermediate section 3 with the bottom section 2 and to prevent lateral movement of the intermediate section 3.

In reference to the intermediate overlapping joint 66, as shown in FIG. 8 and FIG. 10, the lateral wall 7 of the top section 4 is concentrically positioned within the lateral wall 7 of the intermediate section 3. The bottom wall 8 of the top section 4 and the third enclosure 11 of the top section 4 are positioned about the distal end 6 of the intermediate section 3. Each of the plurality of second locking systems 34 is engaged to the distal end 6 of the intermediate section 3 thus locking the intermediate section 3 with the top section 4. Each of plurality of second tightening systems 43 is engaged to the distal end 6 of the intermediate section 3 in order to further tighten the top section 4 with the intermediate section 3 and to prevent lateral movement of the top section 4.

In reference to the top overlapping joint 67, as shown in FIG. 5 and FIG. 12, the coupling 70 of the wind turbine assembly 17 is concentrically positioned around the lateral wall 7 of the top section 4 as the coupling 70 is positioned about the distal end 6 of the top section 4. As a result, the top overlapping joint 67 is able to further strengthen the connection between the wind turbine assembly 17 and the top section 4.

Furthermore, the internal space of the bottom section 2, the intermediate section 3, and the top section 4 are configured as a usable internal space so that the maintenance/repair crews can easily maneuver from one section to another. It is understood that necessary doors, windows, stairs, and other related components are built into the usable internal space of the bottom section 2, the intermediate section 3, and the top section 4 without deviating from the scope of the functionality.

Optionally, an external elevator system can be mounted to the telescopic tubular tower 1 so that installation and external maintenance, repairs, and replacement can be performed within the present invention. Furthermore, an optional the external elevator system can provide a quick way to reach the wind turbine assembly 17 when necessary. Optionally, an external crane can be mounted to the wind turbine assembly 17 to lift and lower materials and personals to and from the wind turbine assembly 17.

Although the invention has been explained in relation to its preferred embodiment, it is to be understood that many other possible modifications and variations can be made without departing from the spirit and scope of the invention as hereinafter claimed.

What is claimed is:

1. A telescopic wind turbine tower comprising:
a base;
a telescopic tubular tower;
a wind turbine assembly;
a first jacking system;
a second jacking system;
a third jacking system;
the telescopic tubular tower comprising a bottom section, at least one intermediate section, and a top section;
the bottom section, the intermediate section, and the top section each comprising a lateral wall and a bottom wall;
the lateral wall being perimetrically and hermetically connected around the bottom wall;
the bottom section being concentrically mounted onto the base;
the intermediate section being concentrically positioned within the bottom section, opposite to the base;
the lateral wall of the intermediate section being radially positioned within the lateral wall of the bottom section;
the intermediate section being slidably engaged to the bottom section through the first jacking system and the second jacking system;
the top section being concentrically positioned within the intermediate section, opposite to the bottom section;
the lateral wall of the top section being radially positioned within the lateral wall of the intermediate section;
the top section being slidably engaged to the intermediate section through the second jacking system and the third jacking system; and
the wind turbine assembly being mounted to the top section, opposite to the intermediate section.

2. The telescopic wind turbine tower as claimed in claim 1, wherein a bottom wall of the bottom section being connected to the base.

3. The telescopic wind turbine tower as claimed in claim 1 comprising:
the first jacking system is integrated into the bottom section; and
the first jacking system being positioned adjacent to the bottom wall of the bottom section.

4. The telescopic wind turbine tower as claimed in claim 3 comprising:
the first jacking system comprising a pump, a drain valve, and a drain port;
the pump being externally positioned to the bottom section;
the drain valve being externally positioned to the bottom section;
the drain port being integrated into the lateral wall of the bottom section; and
the pump being in fluid communication with the drain port through the drain valve.

5. The telescopic wind turbine tower as claimed in claim 1 comprising:
the intermediate section further comprising a first enclosure and a second enclosure;
the first enclosure being positioned parallel to the second enclosure;
the first enclosure being positioned within the lateral wall of the intermediate section;
the second enclosure being positioned within the lateral wall of the intermediate section;
the first enclosure being positioned in between the bottom wall of the intermediate section and the second enclosure;
the first enclosure being offset of the second enclosure;
the first enclosure being perimetrically and hermetically connected to the lateral wall of the intermediate section;
the second enclosure being perimetrically and hermetically connected to the lateral wall of the intermediate section; and
the second jacking system being integrated into the bottom wall of the intermediate section.

6. The telescopic wind turbine tower as claimed in claim 5 comprising:
the second jacking system comprising a pump, a drain valve, and a drain port;
the pump being positioned within the lateral wall of the intermediate section;
the pump being positioned within the first enclosure and the second enclosure;
the drain valve being positioned within the bottom wall of the intermediate section and the first enclosure of the intermediate section;
the drain port being integrated into the bottom wall of the intermediate section; and
the pump being in fluid communication with the drain port through the drain valve.

7. The telescopic wind turbine tower as claimed in claim 1 comprising:
the top section further comprising a third enclosure and a fourth enclosure;
the third enclosure being positioned parallel to the fourth enclosure;
the third enclosure being positioned within the lateral wall of the top section;
the fourth enclosure being positioned within the lateral wall of the top section;
the third enclosure being positioned in between the bottom wall of the top section and the fourth enclosure;
the third enclosure being offset of the fourth enclosure;
the third enclosure being perimetrically and hermetically connected to the lateral wall of the top section;
the fourth enclosure being perimetrically and hermetically connected to the lateral wall of the top section; and
the third jacking system being integrated into the bottom wall of the top section.

8. The telescopic wind turbine tower as claimed in claim 7 comprising:
the third jacking system comprising a pump, a drain valve, and a drain port;
the pump being positioned within the lateral wall of the top section;
the pump being positioned within the third enclosure and the fourth enclosure;
the drain valve being positioned within the bottom wall of the top section and the third enclosure of the top section;
the drain port being integrated into the bottom wall of the top section; and
the pump being in fluid communication with the drain port through the drain valve.

9. The telescopic wind turbine tower as claimed in claim 1 comprising:
a plurality of first locking systems;
a plurality of first tightening systems;
each of the plurality of first locking systems being radially positioned with a first enclosure of the intermediate section; and
each of the plurality of first tightening systems being radially positioned within a second enclosure of the intermediate section.

10. The telescopic wind turbine tower as claimed in claim 9 comprising:
each of the plurality of first locking systems comprising a jack body, a piston rod, a locking shim, a locking support, a lateral opening, and a stop;
the jack body being connected within the first enclosure of the intermediate section;
the piston rod being operatively coupled to the jack body, wherein the jack body actuate the lateral movement of the piston rod;
the locking shim is connected to a free end of the piston rod;
the locking support being internally connected to the lateral wall of the bottom section;
the locking support being positioned adjacent to a distal end of the bottom section;
the lateral opening traversing through the lateral wall of the intermediate section;
the stop being externally connected to the lateral wall of the intermediate section;
the stop being positioned in between the first enclosure and the bottom wall of the intermediate section;
the locking shim being concentrically positioned within the lateral opening;
the locking shim being laterally engaged with the locking support; and
the locking support being positioned between the locking shim and the stop.

11. The telescopic wind turbine tower as claimed in claim 10 comprising:
the bottom section further comprising a lower wall stiffener;
the lower wall stiffener of the bottom section being externally connected to the lateral wall of the bottom section;
the lower wall stiffener of the bottom section being positioned about a distal end of the bottom section; and
the locking shim being laterally engaged within the lower wall stiffener of the bottom section.

12. The telescopic wind turbine tower as claimed in claim 9 comprising:
each of the plurality of first tightening systems comprising a jack body, a piston rod, a tightening shim, a tightening support, and a lateral opening;
the jack body being connected within the second enclosure of the intermediate section;
the piston rod being operatively coupled to the jack body, wherein the jack body actuates the lateral movement of the piston rod;
the tightening shim being connected to a free end of the piston rod;
the tightening support being internally connected to the lateral wall of the bottom section;
the tightening support being positioned adjacent to a distal end of the bottom section;
the lateral opening traversing through the lateral wall of the intermediate section;
the tightening support being positioned adjacent to the lateral opening;
the tightening shim being concentrically positioned within the lateral opening;
the tightening shim being laterally engaged with the lateral wall of the bottom section; and
the tightening shim being positioned atop the tightening support.

13. The telescopic wind turbine tower as claimed in claim 12 comprising:
the bottom section further comprising an upper wall stiffener;
the upper wall stiffener of the bottom section being externally connected to the lateral wall of the bottom section;
the upper wall stiffener of the bottom section being positioned about a distal end of the bottom section; and
the tightening shim being laterally engaged against the upper wall stiffener of the bottom section through the lateral wall of the bottom section.

14. The telescopic wind turbine tower as claimed in claim 9 comprising:
a first pressure seal;
the first pressure seal being externally connected to the lateral wall of the intermediate section and a stop of each of the plurality of first locking systems;
the first pressure seal being positioned adjacent to the bottom wall of the intermediate section; and
the first pressure seal being radially and hermetically interposed between the lateral wall of the intermediate section and the lateral wall of the bottom section.

15. The telescopic wind turbine tower as claimed in claim 1 comprising:
a plurality of second locking systems;
a plurality of second tightening systems;
each of the plurality of second locking systems being radially positioned around a third enclosure of the top section; and
each of the plurality of second tightening systems being radially positioned within a fourth enclosure of the top section.

16. The telescopic wind turbine tower as claimed in claim 15 comprising:
each of the plurality of second locking systems comprising a jack body, a piston rod, a locking shim, a locking support, a lateral opening, and a stop;
the jack body being connected within the third enclosure of the top section;
the piston rod being operatively coupled to the jack body, wherein the jack body actuate the lateral movement of the piston rod;

the locking shim is connected to a free end of the piston rod;

the locking support being internally connected to the lateral wall of the intermediate section;

the locking support being positioned adjacent to a distal end of the intermediate section;

the lateral opening traversing through the lateral wall of the top section;

the stop being externally connected to the lateral wall of the top section;

the stop being positioned in between the third enclosure and the bottom wall of the top section;

the locking shim being concentrically positioned within the lateral opening;

the locking shim being laterally engaged with the locking support; and the locking support being positioned between the locking shim and the stop.

17. The telescopic wind turbine tower as claimed in claim 16 comprising:

the intermediate section further comprising a lower wall stiffener;

the lower wall stiffener of the intermediate section being externally connected to the lateral wall of the intermediate section;

the lower wall stiffener of the intermediate section being positioned about a distal end of the intermediate section; and the locking shim being laterally engaged within the lower wall stiffener of the intermediate section.

18. The telescopic wind turbine tower as claimed in claim 15 comprising:

each of the plurality of second tightening systems comprising a jack body, a piston rod, a tightening shim, a tightening support, and a lateral opening;

the jack body being connected within the fourth enclosure of the top section;

the piston rod being operatively coupled to the jack body, wherein the jack body actuate the lateral movement of the piston rod;

the tightening shim is connected to a free end of the piston rod;

the tightening support being internally connected to the lateral wall of the intermediate section;

the tightening support being positioned adjacent to a distal end of the intermediate section;

the lateral opening traversing through the lateral wall of the top section;

the tightening support being positioned adjacent to the lateral opening;

the tightening shim being concentrically positioned within the lateral opening;

the tightening shim being laterally engaged with the lateral wall of the intermediate section; and the tightening shim being positioned atop the tightening support.

19. The telescopic wind turbine tower as claimed in claim 18 comprising:

the intermediate section further comprising an upper wall stiffener;

the upper wall stiffener of the intermediate section being externally connected to the lateral wall of the intermediate section;

the upper wall stiffener of the intermediate section being positioned about a distal end of the intermediate section; and the tightening shim being laterally engaged against the upper wall stiffener of the intermediate section through the lateral wall of the intermediate section.

20. The telescopic wind turbine tower as claimed in claim 15 comprising:

a second pressure seal;

the second pressure seal being externally connected to the lateral wall of the top section;

the second pressure seal being positioned adjacent to the bottom wall of the top section and a stop of each of the plurality of second locking systems; and the second pressure seal being radially and hermetically interposed between the lateral wall of the top section and the lateral wall of the intermediate section.

21. The telescopic wind turbine tower as claimed in claim 1 comprising:

at least one first track system;

the first track system comprising a first low-friction guide and a first low-friction groove;

the first low-friction groove being internally positioned to the lateral wall of the bottom section;

the first low-friction groove being linearly connected along the lateral wall of the bottom section;

the first low-friction guide being externally positioned to the lateral wall of the intermediate section;

the first low-friction guide being linearly connected along the lateral wall of the intermediate section; and the first low-friction groove being slidably engaged to the first low-friction guide.

22. The telescopic wind turbine tower as claimed in claim 1 comprising:

at least one second track system;

the second track system comprising a second low-friction guide and a second low-friction groove;

the second low-friction groove being internally positioned to the lateral wall of the intermediate section;

the second low-friction groove being linearly connected along the lateral wall of the intermediate section;

the second low-friction guide being externally positioned to the lateral wall of the top section;

the second low-friction guide being linearly connected along the lateral wall of the top section; and the second low-friction groove being slidably engaged to the second low-friction guide.

23. The telescopic wind turbine tower as claimed in claim 1 comprising:

a first rain seal;

a second rain seal;

the first rain seal being perimetrically connected to a top edge of the bottom section; and the second rain seal being perimetrically connected to a top edge of the intermediate section.

24. The telescopic wind turbine tower as claimed in claim 1, wherein the base is a ground foundation.

25. The telescopic wind turbine tower as claimed in claim 1, wherein the base is a floating hull.

26. The telescopic wind turbine tower as claimed in claim 25 comprising:

a plurality of mooring lines;

a submerged counterweight;

a tubular support column;

the submerged counterweight being concentrically connected to the base by the tubular support column, wherein the tubular support column functions as the bottom static section of the telescopic wind turbine tower extending through the base and the above the base;

the plurality of mooring lines being radially positioned around the base;

a first end of each of the plurality of mooring lines being connected to the base; and a second end of each of the plurality of mooring lines being tensionally tethered to a subsurface environment.

27. The telescopic wind turbine tower as claimed in claim 1 comprising:

the wind turbine assembly comprising a nacelle, a gearbox, a generator, a main shaft, a hub, a plurality of blades, a coupling, and a yaw drive;

the gearbox, the generator, and the main shaft being positioned within the nacelle;

the hub being externally positioned to the nacelle;

a stator of the generator being mounted to the nacelle;

the gearbox being mounted to the nacelle;

a rotor of the generator being rotatably connected to the main shaft through the gearbox;

the hub being axially connected to the main shaft;

each of the plurality of blades being radially connected to the hub;

the yaw drive being externally mounted to the nacelle;

the coupling being mounted to the yaw drive; and the nacelle being mounted to a distal end of the top section by coupling through the yaw drive.

28. The telescopic wind turbine tower as claimed in claim 1 comprising:

a bottom overlapping joint;

a plurality of first locking systems;

a plurality of first tightening systems;

the lateral wall of the intermediate section being concentrically positioned within the lateral wall of the bottom section;

the bottom wall of the intermediate section and a first enclosure of the intermediate section being positioned about a distal end of the bottom section;

each of the plurality of first locking systems being engaged to the distal end of the bottom section; and each of the plurality of first tightening systems being engaged to the distal end of the bottom section.

29. The telescopic wind turbine tower as claimed in claim 1 comprising:

an intermediate overlapping joint;

a plurality of second locking systems;

a plurality of second tightening systems;

the lateral wall of the top section being concentrically positioned within the lateral wall of the intermediate section;

the bottom wall of the top section and a third enclosure of the top section being positioned about a distal end of the intermediate section;

each of the plurality of second locking systems being engaged to the distal end of the intermediate section; and each of the plurality of second tightening systems being engaged to the distal end of the intermediate section.

30. The telescopic wind turbine tower as claimed in claim 1 comprising:

a top overlapping joint;

a coupling of the wind turbine assembly being concentrically positioned around the lateral wall of the top section; and the coupling being positioned about a distal end of the top section.

* * * * *